May 18, 1943.  C. M. KENDRICK  2,319,238
FLUID PRESSURE DEVICE
Filed Sept. 12, 1941   5 Sheets-Sheet 1

INVENTOR
Charles M. Kendrick
BY Bartlett, Eyre, Keel & Weymouth
ATTORNEYS

May 18, 1943.  C. M. KENDRICK  2,319,238
FLUID PRESSURE DEVICE
Filed Sept. 12, 1941  5 Sheets—Sheet 2

INVENTOR
Charles M. Kendrick
BY
Bartlett, Eyre, Keel & Weymouth
ATTORNEYS

INVENTOR
Charles M. Kendrick
BY
ATTORNEYS

May 18, 1943.  C. M. KENDRICK  2,319,238
FLUID PRESSURE DEVICE
Filed Sept. 12, 1941  5 Sheets-Sheet 4

INVENTOR
Charles M. Kendrick
BY
Bartlett, Eyre, Keel & Weymouth
ATTORNEYS

May 18, 1943.　　　C. M. KENDRICK　　　2,319,238
FLUID PRESSURE DEVICE
Filed Sept. 12, 1941　　　5 Sheets-Sheet 5
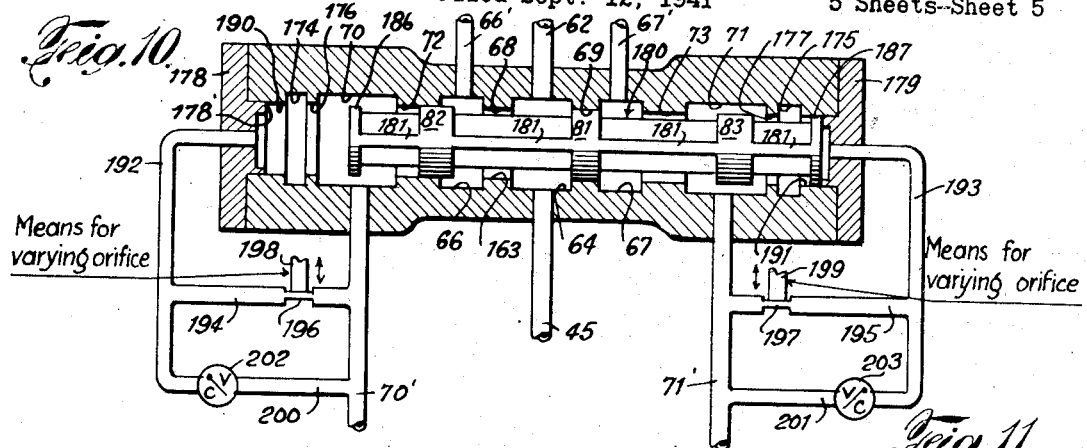
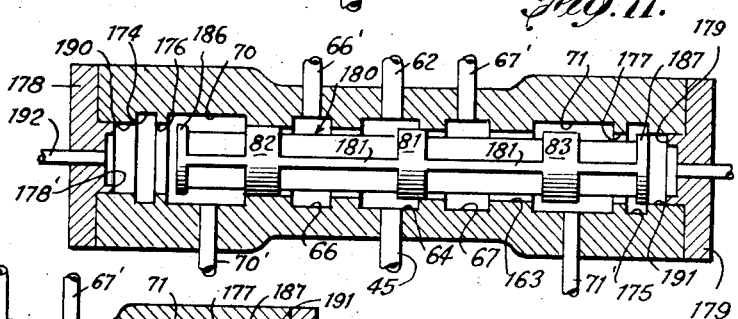
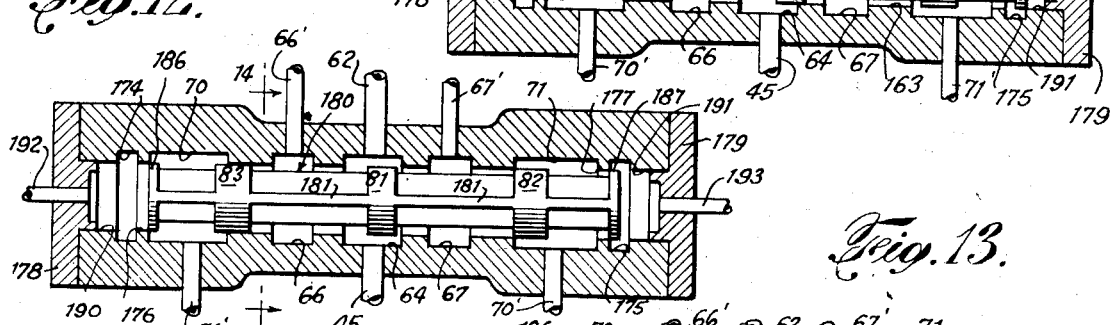
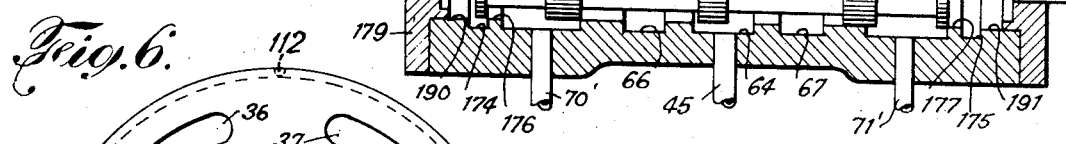
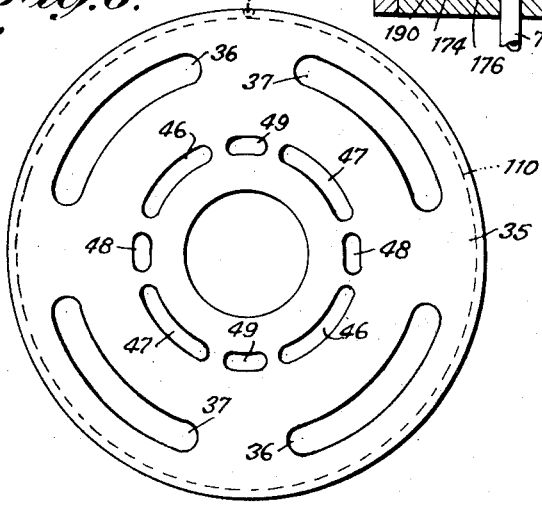
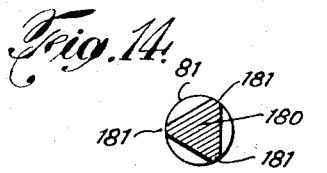
INVENTOR
Charles M. Kendrick
BY
Bartlett, Eyre, Keel & Weymouth
ATTORNEYS Patented May 18, 1943

2,319,238

UNITED STATES PATENT OFFICE 2,319,238

FLUID PRESSURE DEVICE

Charles M. Kendrick, New York, N. Y., assignor to Manly Corporation, Washington, D. C., a corporation of Delaware Application September 12, 1941, Serial No. 410,527

20 Claims. (Cl. 121—92)

This invention relates to reversible vane type fluid pressure devices and to associated control valve mechanism and systems therefor and particularly to vane type motors and controls and systems. The invention relates still more particularly to reversible vane type fluid pressure devices and to associated control valve mechanism and systems therefor in which over-run of the rotary assembly may take place incident to reversal of its direction of rotation, as will be more fully explained presently.

Vane type motors of this general class include a vane track that surrounds the rotor and vane assembly and is adapted to contact the outer ends of the vanes and to guide and control their inward and outward motion as the rotor revolves. For quiet and satisfactory operation of the motor it is practically essential that the outer ends of the vanes be urged into contact with the vane track when operation of the motor is started and that such contact be maintained continuously during its operation. In order to provide this track-contacting and track-following action of the vanes it is necessary to supplement the action of centrifugal force with an auxiliary force acting to urge the vanes outward, at least during the portion of their rotary travel in which they are passing through the intake area or areas of the motor, so that the outer ends of the vanes will be held firmly in contact with the surrounding vane track and thus provide a movable resistance to the pressure fluid admitted to the outer ends of the vanes, whereby rotary motion is imparted to the rotor and driven shaft of the vane motor. In the vane motor of the present invention, fluid pressure means are utilized to provide this auxiliary force and this is accomplished by introducing or admitting, behind the inner ends of the vanes, fluid having pressure sufficient to move said vanes outward and keep their outer ends in cont ct with the vane track while passing through the intake area or areas. The present invention is not concerned with the nature of the pressure fluid admitted to the inner ends of the vanes for the above stated purpose (hereinafter termed pressure fluid for the inner ends of the vanes) and fluid pressure of any nature or amount meeting the above stated requirements may be employed within the scope of the present invention. Thus, for example, the fluid pressure for the inner ends of the vanes may be a substantially constant pressure sufficient in amount to move the vanes outward and keep them in contact with the track irrespective of the pressure of the fluid admitted to the high pressure areas for the outer ends of the vanes. In practice, however, it has been found that with motors of the character under consideration best results are obtained by using differential high pressure fluid as the pressure fluid for the inner ends of the vanes, that is to say, a pressure fluid for the inner ends of the vanes exceeding by a substantially constant amount the pressure of the fluid admitted to the pressure areas for the outer ends of the vanes (termed the working pressure fluid or the operating pressure fluid) as fully explained in co-pending application Serial No. 198,449, filed March 28, 1938, since issued as Patent No. 2,255,781, and the present invention accordingly has been illustrated in connection with the use of differential high pressure fluid for the inner ends of the vanes which is greater than the working pressure. The means by which these two fluids are provided form no part of the present invention. For purposes of illustration, however, the embodiments illustrated in the accompanying drawings show means by which these two different pressures are obtained by passing the supply of fluid going to the motor through resistance valve mechanism positioned in the fluid supply conduit, as will be later more fully explained; but it is to be understood that any other suitable means may be employed for providing these two different but related pressures such, for example, as other means disclosed in Patent No. 2,255,781 above mentioned or in copending application filed May 5, 1939, Serial Number 271,874, since issued as Patent No. 2,255,782.

The driven shaft, rotor and vanes are the only rotating parts of a vane type fluid motor of the character under consideration and constitute its entire rotary assembly. These parts are relatively small and light in weight, and their inertia is usually so small that, when these parts constitute the entire inertia load, they may be stopped almost instantly upon reversal of high and low pressure fluid connections to reverse the direction of rotation of the rotary assembly. In fact, the small size and light weight of the rotating masses of vane motors of this class are among the most important and distinctive features of such motors and make possible exceedingly rapid acceleration, deceleration and reversal. These motors are frequently employed, however, to drive members or devices providing relatively large inertia loads which require either an extremely high pressure of the operating pressure fluid to instantly stop their rotation or a relatively longer time for deceleration. In most instances it is not practical to instantly stop the rotation of large inertia loads when rotating at high speeds because (among other reasons) of the extremely and excessively high pressure required to effect such stoppage and it is customary to decelerate the load as rapidly as can be accomplished within certain reasonable pressure limits (for example, as determined by conventional relief valves employed wherever needed) or as may be necessary for the safe operation of the driven device, and during such deceleration the rotary assembly tends to over-run, i. e. tends to continue momentarily to rotate in the direction of its rotation just prior to reversal of the motor's high and low pressure fluid connections. During such over-run the device functions as a vane type pump which is driven by the inertia load, with the speed of its rotary assembly progressively decreasing as deceleration takes place so that there is corresponding decrease in the centrifugal force available to move the vanes outward into contact with the vane track. For quiet and satisfactory operation during periods of over-run it is necessary to provide during such over-run a force to urge the vanes outward as they pass through what are then the low pressure areas, that is to say, the areas which prior to reversal of the motor's high and low pressure fluid connections functioned as the intake areas and were then connected with the supply of working pressure fluid but which, upon reversal of said fluid connections, instantly became the low pressure areas although continuing to function as the intake areas as long as over-run takes place. Unless such auxiliary force is provided the result will be noisy, jerky and unsatisfactory operation comparable to that encountered in any vane type pump if the vanes do not move out properly as they pass through the intake areas and in which the vanes are working against a substantial pressure in the outlet areas, such, for example, as 1,000 lbs. per sq. in., as determined, for example, by the relief valves which limit maximum pressure and permit escape of excess pressure fluid.

Satisfactory operation of a reversible vane type fluid motor in which over-run of the rotary assembly occurs thus requires the provision of an auxiliary force to urge the vanes outward into contact with the vane track during the time that the outer ends thereof are passing through the inlet or intake areas, and this is the case irrespective of whether the inlet areas are the high pressure areas (i. e. the areas connected with the supply of operating pressure fluid) as is the case during normal or non-reversing operation of the motor or whether said inlet areas are the low pressure areas as is the case during over-run of the rotary assembly through the period of deceleration incident to reversal. According to the present invention the pressure fluid for the inner ends of the vanes is employed to provide the auxiliary force to urge the vanes into contact with the vane track both during non-reversing operation (i. e. during periods in which the direction of rotation of the rotary assembly is not being reversed) and during the period of any over-run of the rotary assembly that takes place incident to reversal, as will be more fully explained subsequently.

Patent No. 2,255,781 above mentioned and co-pending application S. N. 356,734, filed September 14, 1940, since issued as Patent No. 2,255,786, disclose arrangements for a reversible vane type fluid motor in which differential high pressure fluid is continuously supplied to the inner ends of all the vanes, irrespective of the direction of rotation of the rotary assembly and also during the period of reversal and of any over-run that may take place. Such arrangements have been found to function satisfactorily as regards smoothness and quietness of operation both during non-reversing operation of the motor and also during reversal irrespective of whether over-run takes place, and they have the advantage of simplicity and low cost. But during periods of operation in which reversal is not being effected, such arrangements provide an unneeded outward force on the vanes as the outer ends thereof pass through the outlet areas (which are then the low pressure areas) and this force, which is usually relatively large and frequently as much as that produced by fluid pressure of 1,000 lbs. per sq. in. on the inner ends of the vanes, causes wear of the vanes and vane track, unnecessarily increases friction between these parts and reduces the efficiency of the motor.

Co-pending application S. N. 336,956, filed May 24, 1940, since issued as Patent No. 2,255,784, discloses arrangements which overcome the objection just mentioned in connection with Patents Nos. 2,255,781 and 2,255,786, the arrangements disclosed in said Patent No. 2,255,784 including two arrangements which provide entirely satisfactory operation of a reversible vane type fluid motor in which over-run takes place. The latter meet all requirements from the standpoints of smooth, quiet operation, reduced wear and efficiency and in certain respects are now regarded as superior to any other known arrangements of this character, but they require either the use of an auxiliary pump and other related equipment or the use of valve mechanism employing two separate valve pistons, etc.

An object of the present invention is to provide an improved reversible vane type motor, together with simple and improved associated control valve mechanism and system therefor, that is capable of satisfactory and efficient operation during periods of its use in which the direction of rotation of its rotary assembly is not being reversed and is also capable of smooth, quiet and satisfactory operation during reversal including any over-run of its rotary assembly that takes place incident to reversal in the direction of rotation thereof, that is free from the objection mentioned in connection with the arrangements disclosed in Patent No. 2,255,781 and that is simpler, more compact and less expensive than the above mentioned arrangements of Patent No. 2,255,784 which provide satisfactory operation during overrun of the rotary assembly.

Another object is to provide a novel and improved reversible vane type motor and associated control valve mechanism and system therefor in which the pressure fluid for the inner ends of the vanes is supplied to the inner ends of the vanes during the time that the outer ends thereof are passing through the inlet area or areas, irrespective of whether the inlet area or areas are the high pressure areas as during non-reversing operation of the device or whether said inlet area or areas are the low pressure areas as during over-run of the rotary assembly incident to reversal, and in which during non-reversing operation of the device the pressure of the fluid acting on the inner ends of the vanes as the outer ends thereof pass through the outlet area or areas is substantially the same as the pressure of the fluid in said outlet areas so that the hydraulic forces acting radially on said vanes are substantially balanced as the vanes pass through the outlet area or areas.

A further object is to provide an improved reversible vane type motor of this character and associated control valve mechanism and system therefor in which the fluid connections necessary to provide the foregoing operating conditions are established upon change or reversal of the fluid connections for the device.

Other objects will appear from the description which follows, in which the present invention is described in connection with a reversible vane type fluid pressure device employed as a fluid motor.

The widest present use for vane motors of this general class is as hydraulic devices, that is to say, devices for handling, or whose motive fluid is a liquid, such for example, as oil. The present invention will accordingly be described in connection with such use although it will be understood that certain features of the invention are also applicable to devices operating with elastic fluids. It will further be understood that the invention is applicable equally to vane type motors of this general class in which the displacement or fluid capacity per revolution of the rotor is constant (termed a "constant capacity motor") and to such motors in which the displacement or fluid capacity per revolution of the rotor is variable (termed a "variable capacity motor").

The invention will be understood from a consideration of the accompanying drawings which illustrate, by way of example, embodiments of the present invention in and in connection with a constant capacity vane motor.

Figure 5:
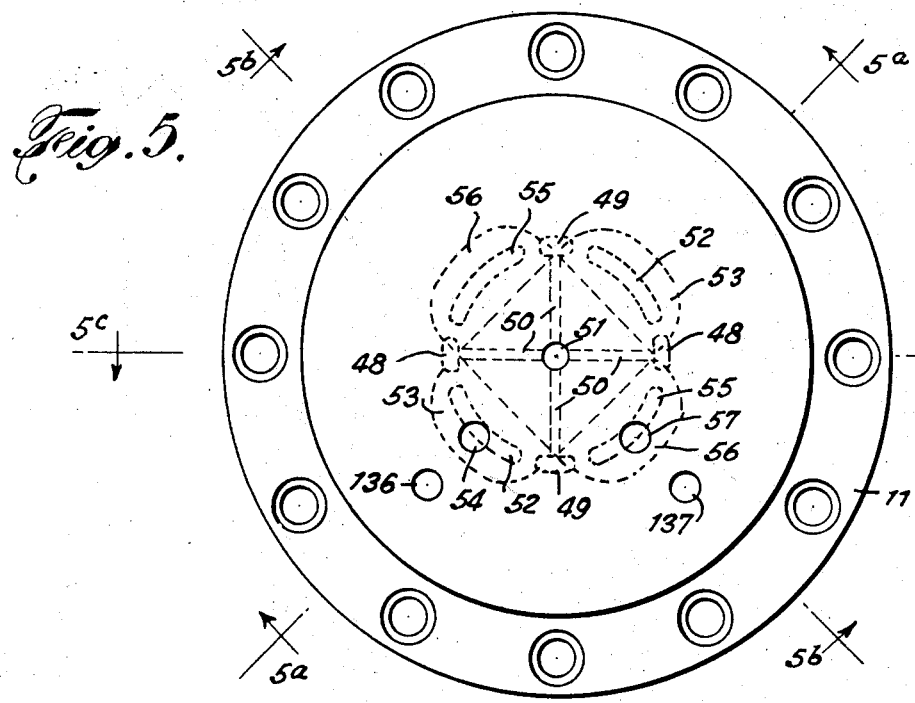
Fig. 5 is an outer or end elevation of the cover or end head member with certain of the fluid passages therein shown in dotted lines.
Figure 5A:
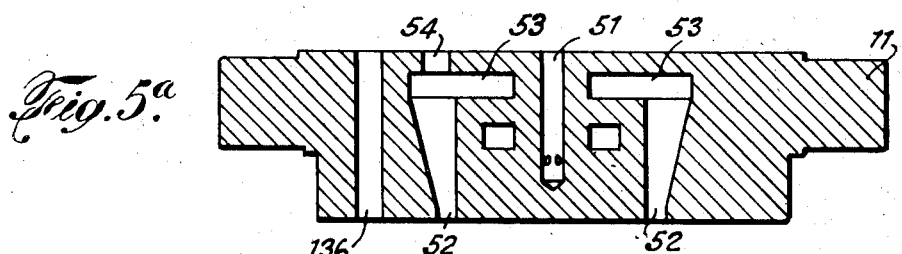
Figure 5B:
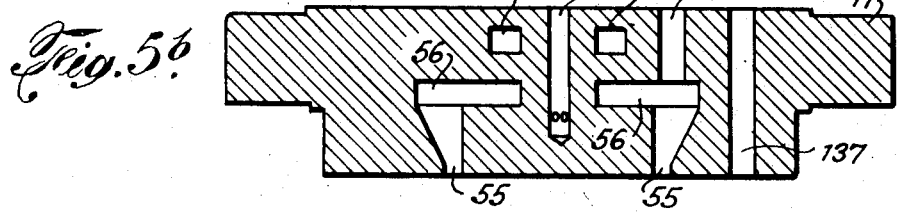
Figure 5C:
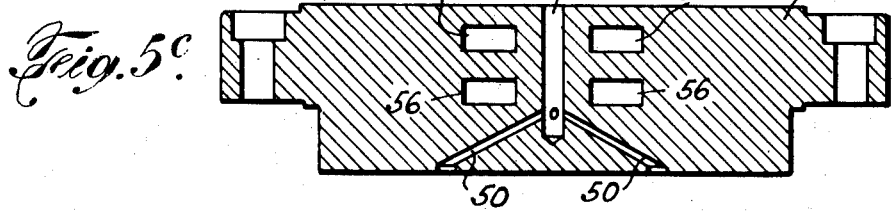
Figure 7:
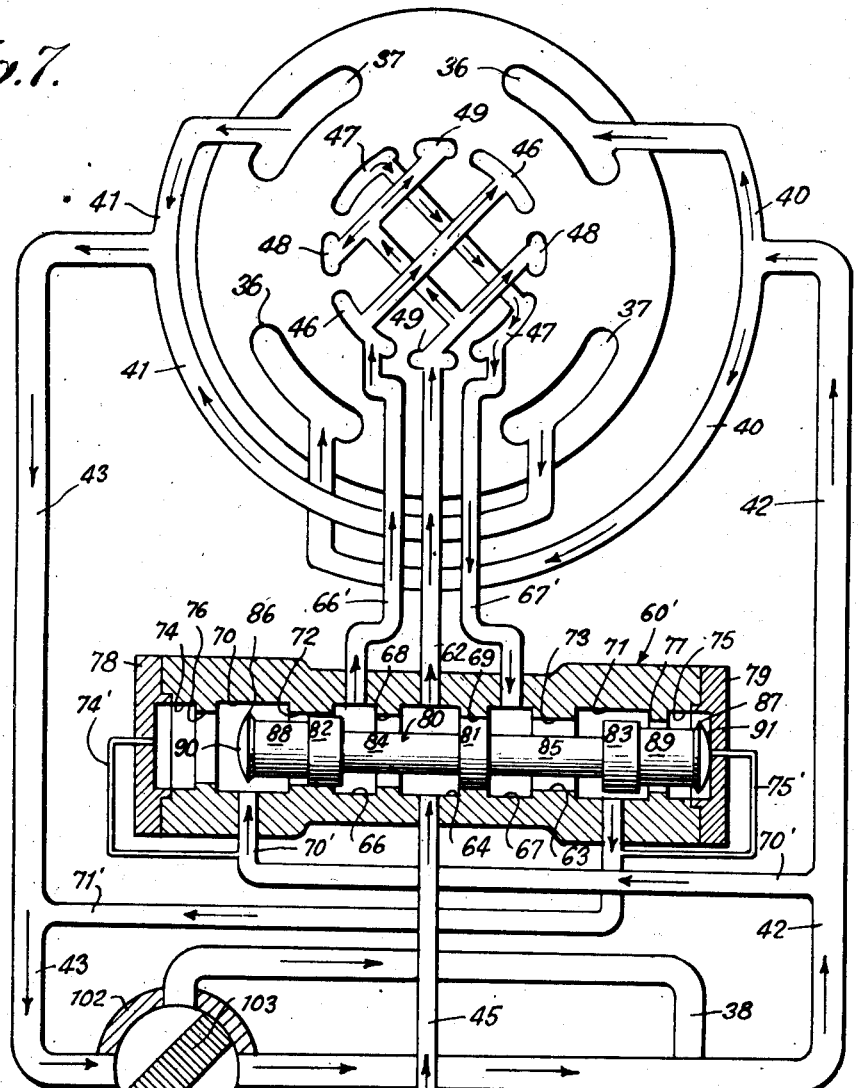
Figure 8:
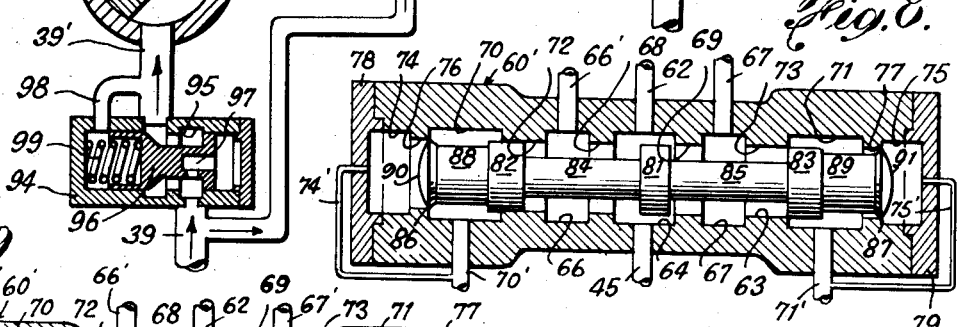
Figure 9:
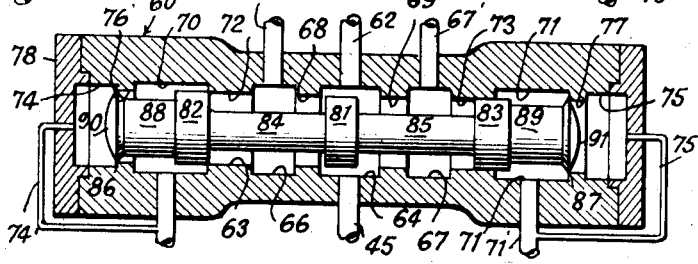

Figs. 5a, 5b and 5c are sectional views through the end head, showing certain of the fluid passages in section, and taken along the lines 5a—5a, 5b—5b and 5c—5c respectively of Fig. 5;

Fig. 6 shows an inner elevation or rotor face of one of the members of the vane motor, for convenience termed an "end plate" or "cheek plate";

Fig. 7 is a diagrammatic view, partly in section, of a fluid system including the vane type fluid motor illustrated in Figs. 1 to 6 inclusive and showing a longitudinal sectional view through the control valve mechanism, with certain minor modifications thereof to be later pointed out, which controls the flow of fluid to and from the inner ends of the vanes;

Figs. 8 and 9 are fragmentary views, partly in section, showing the control valve mechanism shown in Fig. 7 but with the valve piston thereof in different positions;

Figs. 10 to 13 inclusive are fragmentary views, partly in section, illustrating a modification showing the valve piston element thereof in different positions; and Fig. 14 is a transverse sectional view taken along the line 14—14 of Fig. 12, illustrating a feature of construction of the modified valve piston of Figs. 10 to 13.

Figure 1:
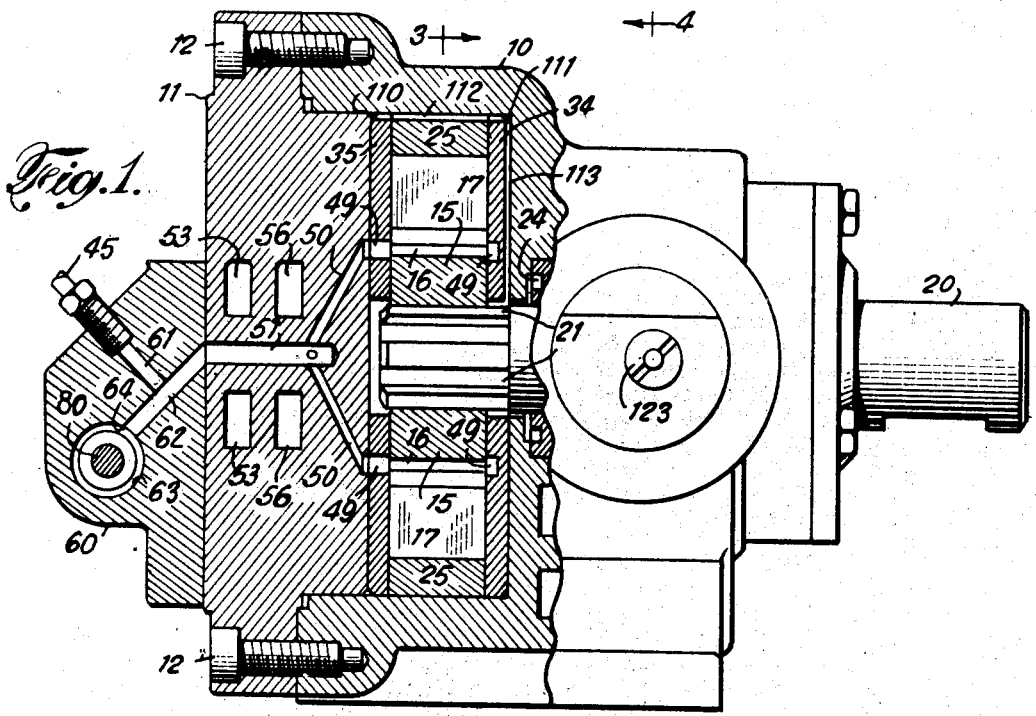
Fig. 1 is a view, partly in side elevation and partly in vertical longitudinal section, of an illustrative embodiment of a reversible vane motor constructed according to the present invention.
Figure 2:
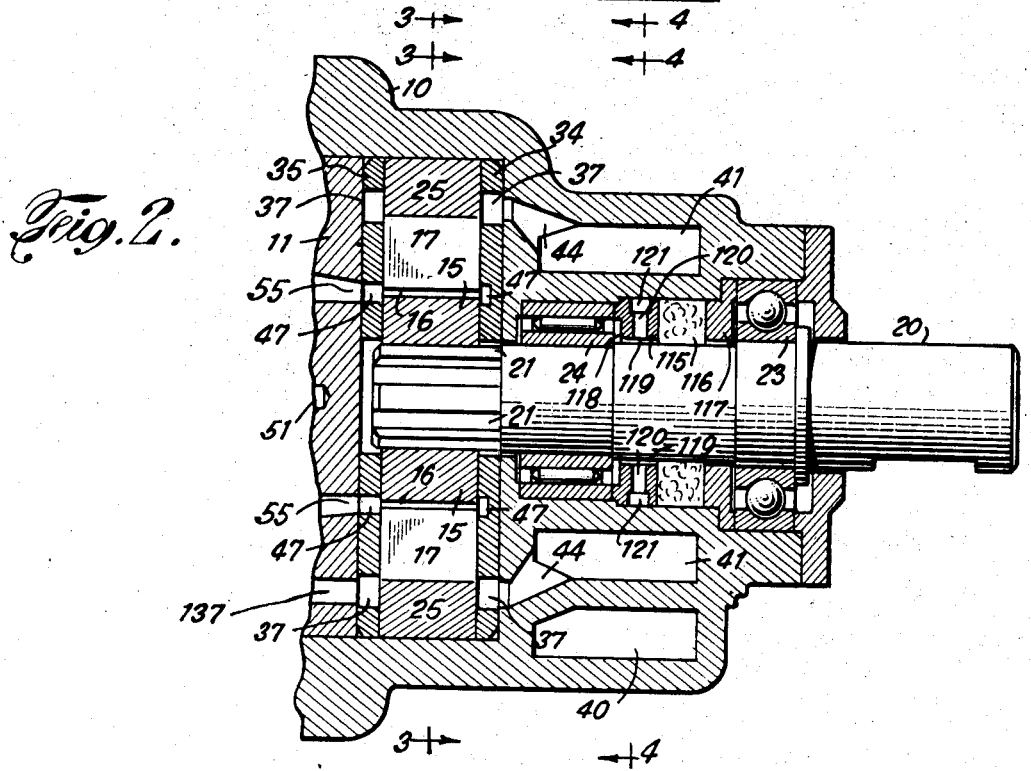
Fig. 2 is a fragmentary longitudinal sectional view taken along the lines 2—2 of Figs. 3 and 4, showing certain parts of the fluid circuit and the method of mounting the shaft.
Figure 3:
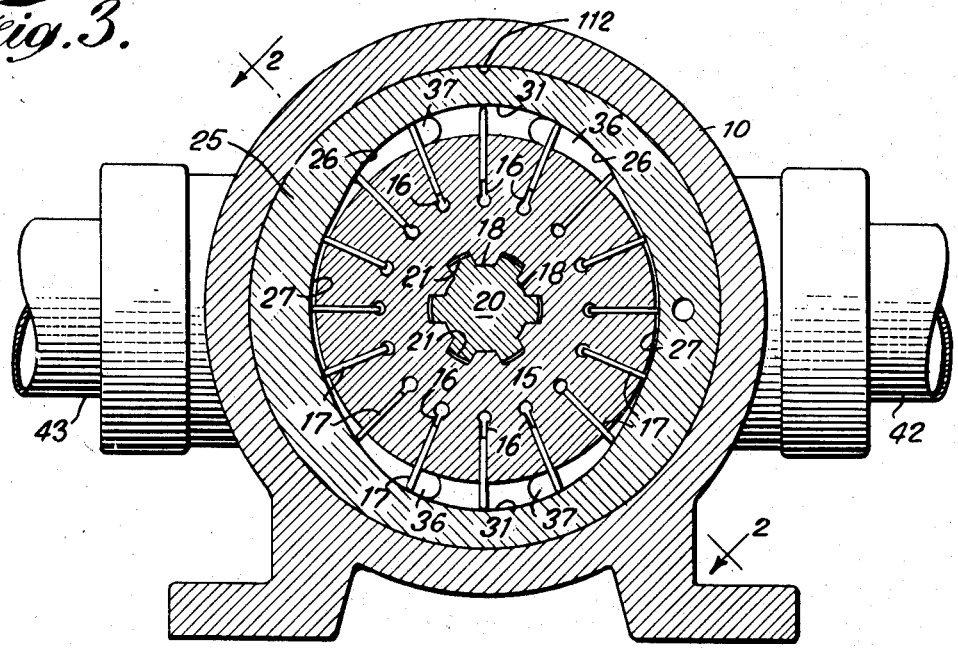
Fig. 3 is a view in vertical section transverse the axis of rotation and taken along the lines 3—3 of Figs. 1 and 2.

Referring now to Fig. 1, the motor includes a casing 10 formed with an open-ended cavity for the rotor 15 and associated parts as shown in Figs. 1 and 2. The rotor cavity is closed (Figs. 1 and 2) by an end head or cover member 11 which is attached to the casing 10 as by cap screws 12. The rotor 15 is provided with a plurality of vanes 17 which are movable in a substantially radial direction inward and outward in the vane slots 16 (Figs. 1, 2 and 3). A vane track ring 25 surrounds the rotor and vane assembly and its inner circumferential surface 26 (Fig. 3) forms a track adapted to contact the radially outer ends of the vanes 17 as the rotor revolves and to guide and control the vanes in their inward and outward movement; the surface 26 will hereinafter be referred to as the "vane track."

The rotor 15 and driven shaft 20 may be mounted and the two parts may be operatively connected with each other in any appropriate manner. In the present instance the rotor 15, shaft 20, their mountings and the operative connections therebetween are the same as disclosed in my co-pending application filed December 8, 1939, Serial Number 307,755. As shown in Fig. 2, the shaft 20 is revolubly supported by a pair of bearing elements 23 and 24 carried by the casing 10 and the rotor 15 is mounted on the end of the shaft 20 which projects into the rotor cavity. For this purpose the end of the shaft 20 is formed with axially extending splines 21 (Figs. 1, 2) and the rotor 15 is formed in its central opening with mating splines 18 (Fig. 3). The arrangement is such that the rotor 15 is freely movable in an axial direction on the shaft splines 21 while permitting a limited angular or rocking motion of the rotor 15 relative to the shaft 20 in such manner that the cheek plates 34 and 35, to be presently described, determine the axial and angular position of the rotor on the shaft and the plane of rotation of the rotor as fully explained in co-pending application Serial Number 307,755 above mentioned.

The rotor 15 is hydraulically balanced with respect to all forces imposed thereon by fluid pressure. Hydraulic balance of forces acting on the rotor in a radial direction is obtained by dividing the space intermediate the periphery of the rotor 15 and the vane track 26 into two equal and oppositely positioned fluid sections, each fluid section comprising a working chamber flanked by an inlet area and an outlet area, the inlet area and outlet area of each section being interchangeable upon reversal as will be more fully explained presently. As shown in Fig. 3, the division between the two fluid sections is effected by cooperation of the rotor 15 and the outer ends of the vanes 17 with the vane track 26 at the regions of the vane track's least diameter which in the present embodiment is adjacent the horizontal centerline. The vane track 26 is preferably provided at each of these points of division with an arc 27, for convenience termed the "sealing arc,"

substantially concentric with the rotor 15 and extending in a circumferential direction for a distance equal to at least the angular distance between a pair of adjacent vanes 17.

The working chambers of the two fluid sections are formed by means of two diametrically positioned arcs 31 (Fig. 3), preferably concentric with the rotor 15 and termed the "working arcs," which are located in the regions of greatest diameter of the vane track 26. Each working chamber extends in a circumferential direction for an arcuate distance substantially equal to the distance between the outer ends of two adjacent vanes 17 which at any given instant are moving in contact with the corresponding working arc 31. Operating pressure fluid is admitted between the vanes as they move through the inlet areas toward the working chambers and fluid is discharged as the vanes recede therefrom through the outlet areas of the two fluid sections. The area of each fluid section is thus at all times separated from the outlet area of that fluid section by at least one of the vanes 17. The portions of the vanes track 26 intermediate the sealing arcs 27 and working arcs 31 may be given any suitable curvature producing satisfactory rates of inward and outward movement of the vanes 17 as the rotor 15 revolves.

The sides of axial ends of the working chambers are closed by a pair of mating disc-shaped members 34 and 35 (Figs. 1, 2, 3 and 6), for convenience termed "end plates" or "cheek plates," which are provided with holes at their centers for the shaft 20. The outer surfaces of the cheek plates 34 and 35 fit snugly against the wall surfaces of the casing 10 and end head 11 respectively and form substantially fluid-tight fits with the several ports and passages to be presently described. The inner or opposing faces of the cheek plates 34 and 35 form fluid-tight fits with the sides of the vane track ring 25 by which they are axially positioned with respect to the rotor 15 in such manner that the rotor is permitted to turn freely while its sides and the sides of the vanes 17 form substantially fluid-tight running fits with the adjacent faces of the cheek plates 34 and 35. The cheek plate 34 will hereinafter be termed the "casing cheek plate" and the cheek plate 35 will be termed the "end head cheek plate."

The cheek plates 34 and 35 are provided with co-extensive mating ports (Figs. 2, 3 and 6), the ports of one cheek plate being axially opposite the ports of the other cheek plate when the parts are in position in the casing 10 so that all forces exerted upon the rotor 15 and vanes 17 in an axial direction by fluid pressure are thus completely balanced. The ports in the cheek plates 34 and 35 will be best understood from Fig. 6 which shows an inner elevation or the rotor face of the end head cheek plate 35. Referring to Fig. 6, each cheek plate is provided with a pair of diametrically opposed arcuate slots or ports 36 and a similar pair of diametrically opposed slots or ports 37; either pair of these ports may be the inlet ports and the other pair will then be the outlet ports, depending upon the direction of flow of fluid in the circuit. The ports 36 and 37 of the casing cheek plate 34 are also partially shown in Fig. 3 and the ports 37 are also shown in the sectional view of Fig. 2. Operating pressure fluid is admitted to the outer ends of the vanes through either the pair of ports 36 or the pair of ports 37 in the casing cheek plate 34, depending upon the fluid connections for said ports existing at any particular time, and similarly, fluid discharged or exhausted by the outer ends of said vanes passes out through the other pair of ports of the same cheek plate. The ports 36 and 37 of the end head cheek plate 35 function principally as "balance ports" to contain fluid under the same pressure as that in the corresponding ports of the casing cheek plate 34 in order to produce hydraulic balance of the rotating parts, as already stated.

Figure 4:
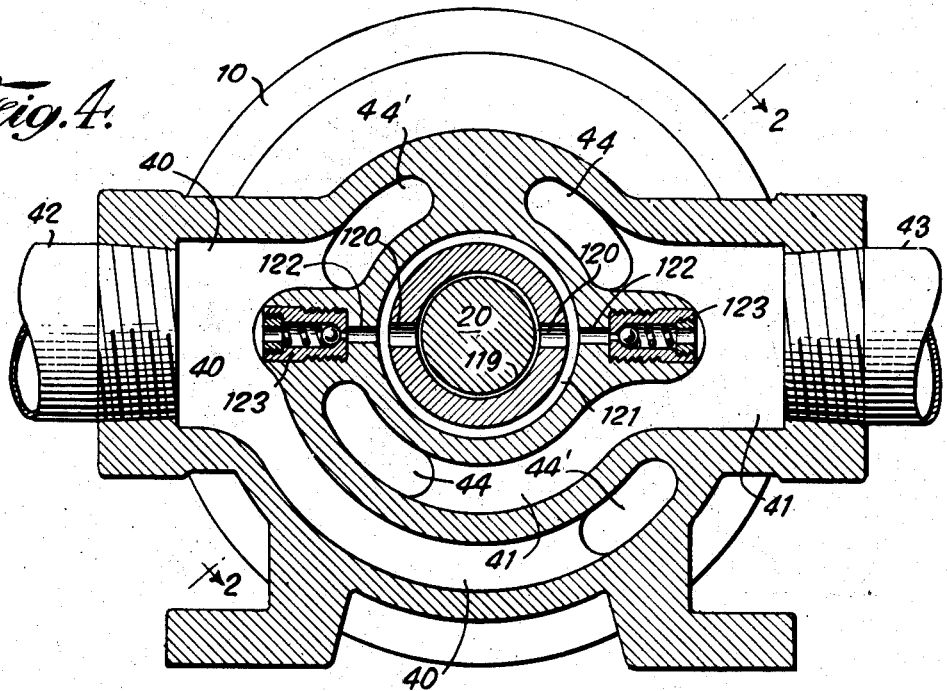
Fig. 4 is also a view in vertical transverse section but is taken along the lines 4—4 of Fig. 1 and looking in a direction opposite to that of Fig. 3.

The portion of the fluid circuit for conveying fluid to and from the outer ends of the vanes 17 also includes a pair of branched channels 40 and 41 respectively (Figs. 2 and 4) which are formed in the casing 10. The fluid channel 41 is connected with the fluid conduit 43 and with the ports 37 of the casing cheek plate 34 by slanted passages 44 (Figs. 2 and 4). The fluid channel 40 is similarly connected with the fluid conduit 42 and is also connected with the two ports 36 of the casing cheek plate 34 as by slanted passages 44' (Fig. 4) similar to the slanted passages 44 shown in Fig. 2.

With the arrangement hereinbefore described, operating pressure fluid admitted to the conduit 42 will pass into the ports 36 of the casing cheek plate 34 and the fluid areas connected with said ports 36 will then be the intake areas; operating pressure fluid acting on the adjacent faces of the vanes 17 that are then in contact with the working arcs 31 will cause rotation of the rotor 15 and shaft 20 in a counter-clockwise direction as viewed in Fig. 3; the fluid areas connected with the ports 37 of the casing cheek plate 34 will then be the outlet or discharge areas and the fluid discharged by the outer ends of the vanes will pass out through the ports 37 of said cheek plate 34, through the connecting passages 44 and channel 41 and out through the conduit 43. Similarly, operating pressure fluid admitted to the conduit 43 will pass to the ports 37 of the casing cheek plate 34, causing rotation of the rotor 15 and shaft 20 in a clockwise direction as viewed in Fig. 3, and fluid exhausted by the outer ends of the vanes 17 will pass out through the ports 36 of the casing cheek plate 34, through the slanted passages 44', the channel 40 and finally out through the conduit 42.

Any preferred means may be employed for reversing the fluid connections of the conduits 42 and 43 so as to connect either of them with the operating pressure fluid and the other with the exhaust. For this purpose Fig. 7 schematically illustrates a reversing valve 102 having a rotatable valve body 103 shown in Fig. 7 in its position in which the conduit 42 is connected with the portion 39' of the supply line and the conduit 43 is connected with the exhaust conduit 38 leading to a suitable reservoir or the like, not shown. Rotation of the valve body 103 through 90° reverses these connections, connecting the conduit 43 with the portion 39' of the supply conduit and connecting conduit 42 with the exhaust conduit 38.

As also shown in Fig. 7 the fluid circuit includes a portion 39 of the supply line into which pressure fluid for operation of the motor is delivered from any suitable source, not shown, such, for example, as a pump, and a differential pressure valve is positioned intermediate the portions 39 and 39' of said supply line, that is to say the differential pressure valve is positioned intermediate said source of pressure fluid and the reversing valve 102. The differential pressure valve shown in Fig. 7 is identical with the corresponding mechanism illustrated in above-mentioned Patent No. 2,255,784 and is similar in principle to the corresponding mechanism disclosed in Patent No. 2,255,781 but differs from the latter in certain features of construction. It includes a housing 94 having a valve bore suitably closed at both its ends and in which a valve piston 96 is slidably fitted. One end of the valve piston 96 is acted upon by pressure fluid in the valve's inlet port 95 admitted to the corresponding end of the valve bore by a passage 97 formed in said valve piston 96. The other end of the valve bore is connected with the portion 39' of the supply line by a passage 98 and the corresponding end of the valve piston 96 is thus acted upon by fluid having the same pressure as the pressure in said portion 39' of the supply line, the hydraulic force thus imposed on that end of the valve piston 96 being supplemented by the force exerted thereon by a spring 99. This differential pressure valve is fully described in Patent No. 2,255,784 to which reference may be had for a more detailed explanation of its construction and functioning. Suffice it to say, however, that the valve piston 96 moves in the valve bore to provide resistance to flow therethrough in an amount such that the pressure of the fluid in the inlet port 95 at all times exceeds by a substantially constant amount (as determined by the spring 99) the pressure of the fluid in the portion 39' of the supply line, and this differential in pressures is maintained irrespective of the absolute pressures existing in said port 95 and said portion 39' of the supply line. The fluid having the higher of these two pressures (i. e. the fluid in the inlet port 95 and the portion 39 of the supply line) is the differential high pressure fluid, which in the present embodiment is used as the pressure fluid for the inner ends of the vanes, and the fluid having the lower of these two pressures (i. e. the fluid in the portion 39' of the supply line) is the working or operating pressure fluid.

The fluid circuit may also include suitable relief valves, not shown, for convenience in illustration, to limit in conventional manner the maximum pressure permitted to exist in the parts of the circuit connected therewith.

The fluid circuit also includes means for the return of fluid leaking internally in the motor, similar to the corresponding arrangement shown in Patent No. 2,255,784. Referring to Fig. 1, fluid leaking radially outward from the high pressure fluid areas and past the vane track ring 25 is collected in the annular passages formed by the chamfered outer edges of the cheek plates 34 and 35, as indicated at 110 and 111 in Fig. 1. The chamfered passage 110 of the end head cheek plate 35 is connected with the chamfered passage 111 of the casing cheek plate 34 by a groove extending axially through said cheek plates and across the outer circumference of the vane track ring 25, this groove being indicated generally by the numeral 112 (Figs. 1 and 3). The outer face of the casing cheek plate 34 is also provided with a radial groove 113 extending from its chamfered edge 111 to the hole at its center, as shown in Fig. 1; the groove 113 is positioned intermediate the ports 36 and 37 and preferably on the vertical centerline as illustrated. All fluid leaking radially outward may thus pass to the hole at the center of the cheek plate 34 and into the space surrounding the shaft 20. Fluid leaking radially inward toward the shaft 20 collects in the holes for said shaft 20 in the cheek plates 34 and 35, the fluid being free to pass axially along the shaft 20 in the spaces between the shaft splines 21 and the rotor splines 18 and may thus pass from the hole at the center of the end head cheek plate 35 to the hole at the center of the casing cheek plate 34. All leakage fluid thus passes to the space between the shaft 20 and the hole for said shaft at the center of the casing cheek plate 34 and then through the clearance for said shaft and through the bearing member 24.

As shown in Fig. 2, the space surrounding the shaft 20 intermediate the bearing members 23 and 24 is filled by an annular spacer member 115, shaft packing 116 and a gland 117. The spacer member 115 is provided with an annular recess 118 on its end adjacent the bearing 24 and this recess 118 connects with the relatively large clearance space 119 between the inner circumference of the spacer member 115 and the shaft 20. Leakage fluid is free to pass axially into the clearance space 119 but is prevented from further axial travel by the shaft packing 116. The spacer member 115 is also provided with radial holes 120, which connect the clearance space 119 with an annular groove or channel 121 on the outer circumference of said spacer member 115 as shown in Figs. 2 and 4.

The fluid channels 40 and 41 are each connected with the shaft bore in the casing 10 by a passage 122 (Fig. 4) which enters said shaft bore at a point to connect with the annular groove 121 on the outer circumference of the spacer member 115. Each passage 122 is provided intermediate its ends with a one-way check valve 123 which closes to prevent the passage of fluid from the corresponding fluid channel 40 or 41 into the shaft bore but opens to permit the passage of fluid in the opposite direction whenever the pressure of the fluid in said shaft bore slightly exceeds the pressure of the fluid in the corresponding fluid channel 40 or 41. With this arrangement, leakage fluid builds up only enough pressure to open the check valve 123 in the passage 122 leading to whichever of the fluid channels 40 or 41 is at the time the discharge or exhaust channel and connected with the exhaust conduit 38. This simple arrangement thus provides for the return of leakage fluid without extra pipes and in practice it has proved entirely satisfactory.

Referring now to Fig. 6, each of the cheek plates 34 and 35 is provided with four pairs of arcuate ports 46, 47, 48 and 49 respectively in the faces thereof adjacent the rotor 15. These ports (for convenience hereinafter termed the "vane slot ports") are positioned to register successively with the inner ends of the vane slots 16 as the rotor revolves and the vane slot ports of each pair are positioned diametrically opposite each other. All fluid passing to and from the inner ends of the vanes and vane slots passes through the vane slot ports of the end head cheek plate 35 and hence all of the vane slot ports in said cheek plate 35 extend through its entire thickness; the vane slot ports of the casing cheek plate 34 serve principally as "balance ports" receiving their supply of fluid through the vane slots 16 and hence they are merely recessed in the rotor face of that cheek plate as shown in Figs. 1 and 2.

Each of the pair of vane slot ports 46 is adapted to connect with the inner end of each vane slot 16 during the time that the outer end of the vane therein is passing through the fluid area connected with the corresponding radially outward port 36; and similarly, each of the pair of vane slot ports 47 is adapted to connect with the inner end of each vane slot 16 during the time that the outer end of the vane therein is passing through the fluid area connected with the corresponding radially outward port 37. In the same manner, each of the pair of vane slot ports 48 and each of the pair of vane slot ports 49 is adapted to connect with the inner end of each vane slot during the time that the outer end of the vane therein is traversing the corresponding sealing arc 27 or working arc 31.

The end head 11 is provided with appropriate fluid passages for conveying fluid to and from each pair of the vane slot ports 46, 47, 48 and 49 of the end head cheek plate 35, as shown in Figs. 1, 2, 5, 5a, 5b and 5c. These passages and the arrangement thereof are similar to corresponding passages shown in Patent No. 2,255,784.

Each of the vane slot ports 48 and 49 in the end head cheek plate 35 registers with one end of its corresponding slanted radial passage 50 formed in the end head 11 and the four passages 50 converge toward and connect with an axial hole or passage 51 which extends to the outer face of the end head 11 (Fig. 5c). The arrangement may be observed from the dotted lines of Fig. 5 and also from the sectional view of Fig. 5c which shows the two passages 50 leading to the pair of vane slot ports 48 and in the sectional view of Fig. 1 which shows the two passages 50 that connect with the vane slot ports 49.

Each of the pair of vane slot ports 46 of the end head cheek plate 35 registers with an arcuate port 52 (Figs. 5 and 5a) formed in the adjacent or inner wall or face of the end head 11 and said ports 52 in turn connect with a cored passage 53 formed in said end head 11. The cored passage 53 connects with one end of an axial hole or passage 54 leading to the outer face of the end head 11. In a similar manner, each of the pair of vane slot ports 47 of the end head cheek plate 35 registers with an arcuate port 55 (Figs. 5 and 5b) in the adjacent or inner wall of the end head 11 and said ports 55 in turn connect with a cored passage 56 connecting with the inner end of an axial hole or passage 57 which leads to the outer face of the end head 11. The general shape and arrangement of the two cored passages 53 and 56 may be observed in the dotted lines of Fig. 5 and from the sectional views of Figs. 5a, 5b and 5c, in which it will be noted that said passages 53 and 56 are positioned in different planes in the end head 11 and that each of them surrounds a solid portion adjacent the vertical and horizontal centerline of the end head, in which solid portion the axial hole or passage 51 is drilled.

With the above described arrangement it will be seen that all fluid going to or from the inner ends of the vanes 17 passes through the holes or passages 51, 54 and 57 that lead through to the outer face of the end head 11.

The two pairs of vane slot ports 48 and 49 are at all times supplied with fluid having sufficient pressure to hold the outer ends of the vanes 17 (i. e. the outer ends of those vanes 17 whose inner ends are connected with said vane slot ports 48 and 49) in contact with the vane track while the outer ends of such vanes are traversing the corresponding arcs 27 and working arcs 31 respectively. For this purpose operating pressure fluid may be employed, as disclosed in co-pending application S. N. 378,524, filed February 12, 1941 since issued as Patent No. 2,256,459; or fluid having a pressure less than but related to the pressure of the operating pressure fluid may be employed, as disclosed in co-pending application S. N. 355,546, filed September 6, 1940 since issued as Patent No. 2,255,785; or, as disclosed in Patent Nos. 2,255,781 and 2,255,784 and as in the embodiment of the invention herein illustrated, differential high pressure fluid may be supplied to the vane slot ports 48 and 49 for this purpose. The outer end of the axial passage 51 in the end head 11 is accordingly connected with the supply of differential high pressure fluid in the present arrangement. Referring to Fig. 1, the outer end of the passage 51 registers with the inner end of a slanted passage 62 which in turn is connected with a somewhat oppositely slanted passage 61 formed in the housing 60 which is securely attached, as by cap screws, not shown, to the outer surface of the end head 11 in such manner that the several passages in said housing 60 make fluid tight connections with the corresponding passages in said end head 11 with which they connect. The outer end of the passage 61 connects with a conduit 45, which, as shown in Fig. 7, is connected with the portion 39 of the supply line, that is to say said conduit 45 connects with the supply line at a point in advance of the differential pressure valve and hence is continuously supplied with differential high pressure fluid. For convenience in illustration, Fig. 7 shows a slightly modified arrangement of these connections in which the conduit 45 does not directly connect with the passage 62 but instead connects with a port 64 of the valve bore 63 (to be presently described) and in which said passage 62 is shown as also connecting with said port 64. With either the arrangement shown in Fig. 1 or the modified arrangement shown in Fig. 7, differential high pressure fluid is continuously supplied to the vane slot ports 48 and 49, through which said differential high pressure fluid is supplied to the inner ends of the vanes 17 while the outer ends thereof are traversing the sealing arcs 27 and working arcs 31, thus urging said vanes outward and keeping the outer ends of said vanes firmly in contact with said sealing and working arcs during this portion of their rotary movement.

An important feature of the present invention is the novel and improved control of the flow of fluid to and from the inner ends of the vanes while the outer ends thereof are passing through the inlet and outlet areas as they move intermediate the sealing arcs 27 and working arcs 31. As earlier stated, satisfactory operation of a reversible vane type fluid motor of the character under consideration requires the provision of an auxiliary force to urge the vanes outward into contact with the vane track during the time that the outer ends thereof are passing through the inlet areas, irrespective of whether the inlet areas are connected with the supply of operating pressure fluid (as is the case during non-reversing operation of the motor) or whether the inlet areas are the low pressure areas (as is the case during over-run of the rotary assembly), and according to the present invention pressure fluid for the inner ends of the vanes is employed to provide such auxiliary force both during non-reversing operation and during overrun. For best efficiency and reduced wear, during non-reversing operation it is also necessary that the pressure of the fluid acting on the inner ends of the vanes as the outer ends thereof pass through the outlet areas be substantially the same as the pressure of the fluid outlet areas in order to substantially balance hydraulic forces acting on the inner and outer ends respectively of such vanes. The novel and improved control of the present invention establishes the necessary fluid connections to provide the foregoing operating conditions, and the embodiments of the invention herein illustrated include novel and improved valve mechanisms for this purpose.

The valve mechanism includes a valve bore 63 in which a valve piston 80 is slidably fitted, as shown in Figs. 1, 7, 8 and 9. In practice the valve bore 63 may be conveniently formed in the housing 60 which is attached to the end head 11, and this general arrangement will be understood from Fig. 1. For convenience in illustration, however the valve mechanism shown in Figs. 7, 8 and 9 has been drawn on a somewhat different scale from that of Fig. 1, the exterior of the housing 60' has been somewhat modified and certain of the fluid passages have been schematically illustrated as will be more particularly pointed out later.

Referring to Figs. 7, 8 and 9, the valve bore 63 is provided at the axial midpoint thereof with an annular counterbore or port 64, the axial length of which is greater than that of certain of the other ports in said valve bore as may be observed in these figures. As previously stated, Fig. 7 shows the port 64 directly connected with the conduit 45, whereas such connection is provided by the slanted passages 61 and 62 (see Fig. 1) when said valve bore 63 is formed in the housing 60. As also stated, Fig. 7 also shows the port 64 as connected with the passage 62 which in turn connects with the vane slot ports 48 and 49, so that with this arrangement the pressure fluid for the inner ends of the vanes which is supplied to the vane slot ports 48 and 49 passes through the port 64.

The valve bore 63 is also provided with a pair of annular ports 66 and 67 respectively which are disposed on opposite axial ends of the port 64. The ports 66 and 67 are of substantially equal axial lengths and are spaced equal axial distances from the port 64 by lands 68 and 69 respectively. The port 66 is adapted to be connected with the pair of vane slot ports 46 and similarly the port 67 is adapted to be connected with the pair of vane slot ports 47, and these connections may be made in any preferred manner; in Fig. 7, these connections are shown schematically as effected by means of passages 66' and 67' respectively which lead to and connect with the vane slot ports 46 and 47 respectively. When the valve bore 63 is formed in the housing 60, however, the passages 66' and 67' are preferably arranged to register and connect with the outer ends of the axial passages 54 and 57 respectively (Figs. 5, 5a and 5b) formed in the end head 11 and which in turn are connected with the vane slot ports 46 and 47 respectively, as already described; this arrangement simplifies the fluid circuit and provides greater compactness.

The valve bore 63 is further provided with a pair of annular ports 70 and 71 respectively which are of substantially equal axial lengths and which are spaced equal axial distances from the ports 66 and 67 respectively by lands 72 and 73 respectively. In Fig. 7 the ports 70 and 71 are shown as connected with the conduits 42 and 43 respectively by passages 70' and 71' respectively, but when the valve bore 63 is formed in the housing 60 it is usually preferable to arrange the passages 70' and 71' to connect with the outer ends of the axial passages 136 and 137 respectively formed in the end head 11 (see Figs. 2, 5, 5a and 5b) whose inner ends connect with one of the ports 36 and one of the ports 37 respectively of the end head cheek plate 35, as illustrated in Fig. 2. Substantially the same operating conditions are provided with either of these arrangements, but the latter is usually preferable because of the simpler fluid circuit, greater compactness, etc. which it makes possible.

The valve bore 63 is still further provided with a pair of counterbores 74 and 75 respectively which are of the same axial length and are here shown as extending into the covers 78 and 79 which close the ends of the valve bore 63. The counterbores 74 and 75 are spaced equal axial distances from the ports 70 and 71 respectively by the lands 76 and 77 respectively, here shown as of relatively short axial length.

The valve piston 80 is provided with a middle head 81 and is also provided with a pair of heads 82 and 83 respectively which are of substantially equal width or axial dimensions and which are substantially equally spaced from the head 81 by the reduced portions 84 and 85 respectively. The middle head 81 is here shown as having an axial dimension somewhat less than that of the heads 82 and 83 and considerably less than the axial length of the port 64. The valve piston 80 further includes a pair of heads 86 and 87 respectively formed near the ends of said valve piston and equally spaced from the heads 82 and 83 by the reduced portions 88 and 89 respectively. The heads 86 and 87 are here shown as of very narrow width or axial dimension, in fact, substantially line width, although this is not essential. The ends of the valve piston 80 are provided with spherical surfaces 90 and 91 respectively in order that substantially the full diameter of the valve piston will be exposed to fluid pressure when the valve piston is in its extreme position at one or the other of the ends of the valve bore 63 and the end of said valve piston is in contact with the corresponding cover 78 or 79, as will be understood from Fig. 7.

During non-reversing operation of the motor the valve piston 80 occupies one or the other of its extreme positions in the valve bore 63, its location depending on whether the operating pressure fluid is connected with the conduit 42 or the conduit 43. This will be understood from Fig. 7 which shows the valve piston 80 in its extreme position toward the right in which it will remain as long as the conduit 42 is connected with the portion 39' of the supply line as illustrated, the valve piston being held in this position by the force exerted on its end 90 by the operating pressure fluid in the port 70, the end 91 of said valve piston at that time being exposed only to the relatively low pressure existing in the port 71 and conduit 43 which are then connected with the exhaust conduit 38.

Referring to Fig. 7, it will be observed that with the valve piston 80 in its extreme position toward the right the port 66 is connected with the port 64, the head 82 cutting off communication between the port 66 and the port 70, and the head 81 cutting off communication between the port 64 and the portions of the valve bore 63 to the right of said head 81. The vane slot ports 46 are thus connected with supply of pressure fluid for the inner ends of the vanes which is supplied to the inner ends of the vanes 17 during the time that the outer ends of said vanes are moving through the areas connected with the ports 36, which areas are then the inlet areas with operating pressure fluid therein, and the vanes 17 are thus moved outward into contact with the vane track. As also shown in Fig. 7, with the valve piston 80 in its extreme position toward the right the port 67 is connected with the port 71; fluid discharged by the inner ends of the vanes 17 into the vane slot ports 47 as the outer ends of said vanes move through the areas connected with the ports 37 (which are then the low pressure and outlet areas) is thus free to pass out through the passage 67', the port 67, the port 71 and the passage 71' into the conduit 43. The pressure of the fluid at the inner ends of the vanes 17 is thus substantially equalized with the pressure of the fluid at the outer ends thereof while the outer ends of said vanes are moving through the outlet areas, the pressure in the vane slot ports 47 being substantially the same as the pressure in the conduit 43 and hence substantially the same as the pressure in the ports 37, which are then the outlet ports. This arrangement provides, therefore, smooth and efficient operation of the motor during operation when the direction of rotation of its rotary assembly is not being reversed.

Relative pressures existing in the conduits 42 and 43 and in the portions of the fluid circuit connected therewith are immediately reversed upon rotation of the valve body 103 through 90° to connect the portion 39' of the supply line with the conduit 43 and to connect the conduit 42 with the exhaust conduit 38, and the foregoing is the case irrespective of whether there is any over-run of the rotary assembly of the motor. Relative pressures acting on the ends 90 and 91 of the valve piston 80 are thus almost instantly reversed, operating pressure fluid in the counterbore 75 acting on end 91 of said valve piston and the force exerted thereby being opposed only by the negligible force due to action of the low pressure fluid in the port 70 (which will then be connected with the exhaust) on the end 90 thereof. The pressure exerted by the operating pressure fluid on its end 91 substantially instantly moves the valve piston 80 toward the left until the heads 86 and 87 come into engagement with the lands 76 and 77 respectively, approximately as illustrated in Fig. 8. With the valve piston 80 in the position shown in Fig. 8, the heads 86 and 87 together with the lands 76 and 77, cut off free and open fluid connection between the counterbores 74 and 75 and the ports 70 and 71 respectively so that rapid movement of the valve piston 80 toward the left is instantly stopped when said heads move into engagement with said lands. As may be observed from Figs. 7 and 8, the fluid connections between the several ports in the valve bore 63, as established by the valve piston 80, remain unchanged as the valve piston 80 commences its movement toward the left and until the heads 86 and 87 are only short distances from the corresponding lands 76 and 77. The arrangement is such, however, that the head 83 comes into engagement with the land 73 at the same time that or just before the heads 86 and 87 come into engagement with the lands 76 and 77 respectively, and the arrangement is also preferably such that the head 81 moves out of engagement with the land 69 just before the head 83 comes into engagement with the land 73 in order to assure that there is always a fluid connection between the port 67 and at least one of the ports 64 or 71, thus preventing trapping of the fluid in said port 67 and in the vane slot ports 47. The latter is readily accomplished by making the length or axial dimension of the valve piston's reduced portion 85 slightly greater than the combined lengths or axial dimensions of the land 69, the port 67 and the land 73, as illustrated in somewhat exaggerated manner in Fig. 8. The slight connection between the port 64 and the port 71 resulting from this arrangement does not adversely affect operation, due in part to the fact that the valve piston 80 is then moving with such great rapidity that such connection exists for only an extremely short interval with the head 83 progressively approaching the land 73 as the head 81 moves away from the land 69; also, the inner ends of the vanes 17 will continue to discharge into the vane slot ports 47 during over-run of the rotary assembly, and during such over-run satisfactory operation will be provided if the pressure in said vane slot ports 47 is merely equalized with the operating pressure fluid which is then being supplied to the ports 36 and also to the port 71.

Referring to Fig. 8, it will be seen, however, that the ports 66 and 67 are both connected with the port 64 when the heads 86 and 87 of the valve piston 80 come into engagement with the lands 76 and 77 respectively, at which time the valve piston 80 ceases its extremely rapid movement toward the left. Both pairs of vane slot ports 46 and 47 are thus connected with the supply of pressure fluid for the inner ends of the vanes, assuring that the vanes 17 will be kept in contact with the vane track regardless of which of the pair of the ports 36 and 37 are at the instant functioning as inlet ports, and hence regardless of whether over-run takes place and regardless of the exact length of the period of any over-run.

The arrangement is made such that the fluid connections thus established between the port 64 and the ports 66 and 67 are maintained for an appreciable interval, time delay or "dwell," and in the embodiment of Figs. 7-9 this interval is made at least equal to the period of over-run of the rotary assembly. An interval of this character may be produced in any preferred manner and by any preferred means. For example, the valve piston 80 may be held substantially stationary during this interval, and in the embodiment illustrated the valve piston 80 would remain approximately in the position in which it is shown in Fig. 8 if the heads 86 and 87 were made to provide fluid tight fits with the lands 76 and 77 respectively, unless some other fluid connections for the counterbores 74 and 75 are provided. A simple arrangement, however, is to provide relatively slow movement of the valve piston 80 throughout the time that its heads 86 and 87 are in engagement with the lands 76 and 77 respectively. This may be accomplished, for example, by providing between the counterbores 74 and 75 and the ports 70 and 71 respectively restricted or limited fluid connections which permit the relatively slow passage of relatively small amounts of fluid to and from said counter-bores when the heads 86 and 87 are in engagement with the lands 76 and 77 respectively. Restricted fluid connections of this character may be provided in numerous ways, for example, by making the diameters of the heads 86 and 87 very slightly smaller than the diameters of the lands 76 and 77 respectively, or by providing small notches or holes extending through the heads 86 and 87. For purposes of illustration, however, I have shown this limited or restricted fluid connection as provided by small by-passes diagrammatically illustrated at 74' and 75' respectively and it will be understood that these include all connections or means suitable for the purpose.

With restricted or limited fluid connections of this character, the valve piston 80 moves relatively slowly throughout the time that its heads 86 and 87 are in engagement with the lands 76 and 77 respectively, this relatively slow movement being due to the small amount of propulsive pressure fluid admitted to the counter-bore 75 to move the valve piston 80 toward the left and also being due to the dash pot action or resistance to movement toward the left simultaneously provided at the end 90 of said valve piston as the head 87 moves across the land 76 toward the cover 78. Movement of the valve piston 80 at this relatively slow speed continues as long as the heads 86 and 87 remain in engagement with the lands 76 and 77 respectively, or in other words, such slow movement commences at the time that said heads move into engagement with said lands, as approximately illustrated in Fig. 8, and continues until said heads have completely traversed said lands and the valve piston has reached approximately the position toward the left as illustrated in Fig. 9. The elapsed time required for such movement of the valve piston 80 depends in part upon and may be altered by changing the length of the axial engagement between the heads 86 and 87 and the lands 76 and 77 respectively, and also in part depends upon and may be altered by change in the extent of the limited or restricted fluid connections for the counter-bores 74 and 75 during the engagement of said heads with said lands.

As may be observed from Figs. 8 and 9, the port 64 remains in connection with both of the ports 66 and 67 throughout the period of relatively slow movement of the valve piston 80 above described. Both pairs of vane slot ports 46 and 47 are thus connected with the supply of pressure fluid for the inner ends of the vanes throughout this interval, assuring that the vanes 17 will be moved outward and kept in contact with the vane track throughout this interval, or in other words, proper vane action is assured during any over-run that may take place and upon cessation of over-run and commencement of rotation of the rotary assembly in the reversed (i. e., clockwise) direction. Smooth, quiet and satisfactory operation of the motor throughout reversal are thus provided, and this is the case both when over-run takes place and when no over-run takes place; it is also the case regardless of the exact period through which over-run takes place, it being merely necessary to make the arrangement such that over-run ceases before the heads 86 and 87 move out of engagement with the lands 76 and 77 respectively.

When the valve piston 80 reaches the position in its movement toward the left in which its heads 86 and 87 move out of engagement with the lands 76 and 77, substantially full and open fluid connection is immediately provided between the counterbore 74 and port 70 and is also simultaneously between the counterbore 75 and port 71. The valve piston 80 is then almost instantly moved to its extreme position toward the left by action of the operating pressure fluid in the port 71 on the end 91 of said valve piston. During this movement of the valve piston 80, the head 82 moves out of engagement with the land 72, to open a path of escape for the fluid that is discharged by the inner ends of the vanes 17 into the vane slot ports 46 and the port 66 when the rotary assembly rotates in the reversed (clockwise) direction, and the head 81 moves into engagement with the land 68 to cut off fluid communication between the ports 64 and 66. To prevent trapping of fluid in the vane slot ports 46 and the port 66 the arrangement is preferably such that the head 82 moves out of engagement with the land 72 just before the head 81 moves into engagement with the land 68, as will be the case with the embodiment illustrated; in fact, this operating condition results with a valve structure arranged to prevent trapping of fluid in the vane slot ports as the valve piston 80 moves from either of its extreme positions at the ends of the valve bore 63 toward the position in which its heads 86 and 87 come into engagement with the lands 76 and 77 respectively, as previously described.

When the valve piston 80 is in its extreme position toward the left, the head 81 is in substantially full engagement with the land 68 and the head 83 is in engagement with the land 73 so that pressure fluid for the inner ends of the vanes will then be supplied to the port 67 and the vane slot ports 37. The head 82 of the valve piston will then be disposed toward the left end of the port 70, providing substantially full and open fluid connection between the port 66 and the passage 70' for the escape of fluid discharge by the inner ends of the vanes 17 through the vane slot ports 46 and also providing substantially equalized pressures of the fluid at the inner ends of the vanes 17 as the outer ends thereof pass through the outlet areas. Quiet, smooth and efficient operation of the motor, with reduced wear of the vanes and vane track, is thus made possible during the time that the motor continues to be operated with its rotary assembly rotating in a clockwise direction.

The cycle of movement and functioning of the valve piston 80 and of the associated parts of the motor and its fluid circuit would be the reverse of those above described if the valve body 103 is again rotated through 90° to return it to the position in which it is shown in Fig. 7 and to re-establish the fluid connections for the conduits 42 and 43 as shown in said Fig. 7. Upon such reversal, the valve piston 80 would immediately move from its extreme position at the left until it reached approximately the position shown in Fig. 9 in which the heads 86 and 87 would come into engagement with the lands 76 and 77 respectively. Relatively slow movement of the valve piston 80 would continue as long as the heads 86 and 87 remained in engagement with the lands 76 and 77 respectively, or in other words until said valve piston 80 reached approximately the position shown in Fig. 8, after which the valve piston 80 would be almost instantly moved to its extreme position at the right, in which it is shown in Fig. 7. The fluid connections between the various ports in the valve bore 63 that are established by the valve piston 80 as it moves toward the right will be understood from the drawings and from the explanation above given.

From the foregoing it will be observed that the cycle of movement or operation of the valve piston 80 taking place upon reversal of relative pressures in the conduits 42 and 43, and hence in the fluid areas connected with said conduits, comprises the following in sequence: (1) a period or stage of extremely rapid movement in which one of the pairs of vane slot ports 46 or 47 are disconnected from the area or conduit which has just been made the high pressure area or conduit by reversal of the relative pressures and are connected with the supply of pressure fluid for the inner ends of the vanes; (2) a period or interval in which both pairs of the vane slot ports 46 and 47 are connected with the supply of pressure fluid for the inner ends of the vanes; and (3) a period or stage of extremely rapid movement of the valve piston in which the other of the pairs of vane slot ports 46 or 47 are disconnected from the supply of pressure fluid for the inner ends of the vanes and are connected with the area or conduit which is then the low pressure (exhaust) area or conduit. The responsive movement and operation of the valve mechanism thus comprises three periods or stages, with all changes in fluid connections for the inner ends of the vanes effected during the period of extremely rapid movement of the valve piston. The ports 46, 46 and 47, 47 are thus interchangeable in that they are connected either respectively with the supply and exhaust lines or vice versa, this interchange taking place incident to reversal of the direction of operation of the motor.

The present invention thus provides satisfactory and efficient operation in either direction of rotation of its rotary assembly during periods of its operation when reversal is not being effected and also provides quiet and satisfactory operation during reversal, regardless of whether overrun takes place. Among its other advantages are its compactness, simplicity and low cost.

The valve mechanism, and the fluid circuit therefor, which controls the flow of fluid to and from the inner ends of the vanes may be modified in numerous ways, such, for example, as the embodiment illustrated in the fragmentary views of Figs. 10 to 14 inclusive, which differ from the embodiment of Figs. 7-9 only in the particulars to be explained. Certain of those parts of the arrangement of Figs. 10-14 which are substantially identical with corresponding parts of the embodiment of Figs. 6-9 have been identified with the same reference numerals used in connnection with Figs. 7-9 and will not be again described.

The modified valve piston 180 of Figs. 10-14 is provided with modified heads 186 and 187 respectively at the ends thereof which have axial lengths greater than that of the corresponding heads 86 and 87 of the embodiment of Figs. 7-9. The valve piston 180 is also shown as provided with axially extending support and guide surfaces 181 which extend between its several heads and the particular construction here employed will be understood from Figs. 10-13 and the sectional view of Fig. 14. Guide surfaces of this general character are well known in the art and are also preferably employed with the arrangement of Figs. 7-9.

The axial lengths of the modified lands 176 and 177 and of the modified counter-bores 174 and 175 of Figs. 10-13 are somewhat less than those of the corresponding lands and counter-bores of Figs. 7-9, and the modified valve bore 163 is also provided with lands 190 and 191 respectively at its axially opposite ends.

The ends of the valve bore 163 are closed by modified covers 178 and 179 respectively, each of which is provided with an inwardly extending flange 178' or 179' which assure that a substantial portion of the corresponding end of the valve piston 180 is exposed to pressure fluid when the valve piston is in one or the other of its extreme positions in the valve bore, as will be understood from Fig. 10.

The cover 178 is connected with a passage 192 which connects with two passages 194 and 200 respectively (Fig. 10) which in turn connect with the passage 70'. The cover 179 is similarly connected with a passage 193 which connects with two passages 195 and 201 respectively (Fig. 10), the latter in turn connecting with the passage 71'. The passages 194 and 195 are provided with any suitable means, preferably adjustable, for regulating the flow of fluid therethrough so as to provide restricted fluid connections for the relatively slow passage of relatively small amounts of fluid. For this purpose the variable orifices 196 and 197 respectively are schematically shown together with means 198 and 199 respectively by which the size or extent of opening of said orifices may be adjusted at will to permit the passage of fluid through said orifices at any desired rate of fluid flow. The passages 200 and 201 are provided with check valves 202 and 203 respectively arranged to permit the flow of fluid therethrough into the corresponding passage 70' or 71' but preventing the passage of fluid in the opposite direction.

As in the embodiment previously described the valve piston 180 of the embodiment of Figs. 10-14 occupies one or the other of its extreme positions at the end of the valve bore during non-reversing operation of the motor, and movement and position of said valve piston 180 are effected and determined by difference in relative pressures to which the opposite ends thereof are exposed. In Fig. 10 the valve piston 180 is shown in its extreme position at the right which it occupies during non-reversing operation of the motor when the conduit 42 is connected with the operating pressure fluid supply, the valve piston being kept in this position during such operation by action of operating pressure fluid in the port 70 on the left end of said valve piston.

Upon reversal of fluid connections for the conduits 42 and 43, whereby the conduit 43 is connected with the operating pressure fluid supply, operating pressure fluid will be admitted instantly to the passage 71' and to the passages and ports connected therewith. The substantially fluid tight fit of the head 187 with the land 191 prevents the passage of fluid from the port 71 to the right hand end of the valve piston, however, and pressure fluid can pass to said right hand end only through the limited or restricted fluid connection provided by the orifice 197 which permits such passage at a relatively slow rate as determined by the extent of opening thereof provided by the adjustment of the means 199. A relatively small volume of pressure fluid will thus be relatively slowly admitted to the right hand end of the valve piston and will cause corresponding relatively slow movement of the valve piston 180 toward the left. Such relatively slow movement of the valve piston 180 continues as long as the head 187 engages the land 191, or in other words, until the valve piston 180 reaches approximately the position in which it is shown in Fig. 11.

By comparison of Figs. 10 and 11 it will be observed that the several fluid connections between the ports of the valve bore 163 remain unchanged during the interval of relatively slow movement of the valve piston 180 just described; that is to say, the connections existing between said ports when the valve piston 180 is in its extreme position at the right, as shown in Fig. 10, also exist when the valve piston 180 reaches the position in which it is shown in Fig. 11 and have continued to exist during the movement of said valve piston between these two positions. More specifically, the port 64 is connected with the port 66 in Fig. 10 and remains connected therewith when the valve piston reaches the position shown in Fig. 11; also, the port 67 is connected with the port 71 in both of these positions of the valve piston 180. With this arrangement, therefore, the fluid connections for the inner ends of the vanes that exist prior to reversal of fluid connections for the outer ends of the vanes are maintained for a short interval after said fluid connections for the outer ends of said vanes are reversed, or in other words, there is a short time delay between reversal of relative pressures in the fluid areas at the outer ends of the vanes and disturbance of the previously existing fluid connections for the inner ends of the vanes. The length of this interval or time delay depends in part upon the extent of opening of the orifice 197, and hence is subject to adjustment at will. Smooth and quiet operation of the motor will result with this time delay when over-run of its rotary assembly takes place for an equally long interval, as pressure fluid for the inner ends of the vanes will continue to be supplied to the inner ends of the vanes while the outer ends thereof move through the inlet areas (which are then the low pressure areas) and both the inner and outer ends of the vanes will then be connected with the operating pressure fluid supply while the outer ends thereof pass through the outlet areas. This arrangement (i. e. the time delay prior to disturbance of fluid connections for the inner ends of the vanes) is not recommended, however, for use in reversing motors in which over-run does not take place.

An arrangement of the character just described, however, is in itself capable of producing quiet and satisfactory operation of a reversible vane type fluid motor in which over-run takes place, and may be so employed where practical, if the time delay in the change of fluid connections for the inner ends of the vanes (as determined by time of engagement of the head 187 with the land 191) is timed to exactly coincide with the period of over-run of the rotary assembly; in such instances, the lands 176 and 177 are preferably omitted so that the valve piston 180 is instantly and uninterruptedly moved to its extreme position at the left end of the valve bore immediately after its head 187 moves out of engagement with the land 191. It is usually difficult, however, to make the time delay coincide exactly with the period of over-run, particularly as the period of over-run is frequently subject to some variation during operation, so it is usually preferable to also employ the lands 176 and 177 as well as the lands 190 and 191.

The functioning of the arrangement of Figs. 10-13 after the valve piston 180 has moved out of engagement with the land 191 is generally similar to that described in connection with the embodiment of Figs. 7-9. Immediately upon disengagement of the head 187 with the land 191, the valve piston instantly moves toward the left until its head 187 engages the land 177, approximately as shown in Fig. 12, and relatively slow movement of the valve piston 180 takes place as said head moves in engagement with said land and until the valve piston has reached approximately the position in which it is shown in Fig. 13. During this period of relatively slow movement of the valve piston 180, the ports 66 and 67 are both connected with the port 64, as may be observed from Figs. 12 and 13, so that both of the pairs of vane slot ports 46 and 47 are connected with the supply of pressure fluid for the inner ends of the vanes, assuring smooth and quiet operation during any over-run that may take place during this interval and also when the rotary assembly begins to rotate in the reversed direction. It is thus unnecessary to provide combined periods of relatively slow movement of the valve piston 180 (i. e., its relatively slow movement due to engagement of its head 187 with the lands 191 and 177) that are exactly equal to the period of over-run; on the contrary it is usually preferable to make these combined periods of relatively slow movement somewhat greater than the expected period of over-run in order to provide for unexpected variation in the latter. The speed of the valve piston 180 during its period of relatively slow movement in which its head 187 engages the land 177 depends in part and often principally upon the extent of the limited fluid connection provided by the orifice 197; it will be observed that dash pot action does not take place at the left end of the valve piston 180 during this or any other period of its movement with the arrangement shown in Fig. 10 because the check valve 202 opens to freely permit the outward passage of fluid from the left end of the valve bore into the passage 70'. Dash pot action may be provided, if desired, by merely omitting the check valves 202 and 203 and the passages 200 and 201 respectively therefor.

With the arrangement as illustrated in Fig. 10 the valve piston 180 moves instantly to its extreme position at the left after its head 187 moves out of engagement with the land 177, and it is in part to permit such instant and uninterrupted movement that the check valves 202 and 203 are provided. This arrangement is sometimes preferable in order to shorten the time required for the valve piston to move to its extreme position after its head moves out of engagement with the land 177 in order that the valve piston may assuredly occupy said extreme position when fluid connections for the conduits 42 and 43 are to be again quickly reversed. Where time interval between reversal permits, satisfactory operation will be provided if the check valves 202 and 203 and the passages therefor are omitted so as to provide that dash pot action and consequently slower movement of the valve piston 180 while its head 186 engages the land 190, as the fluid connections for the inner ends of the vanes are not altered or disturbed during this part of the valve piston's movement.

The cycle of movement of the valve piston 180 would be the reverse of that just described if the fluid connections were again reversed to again connect the conduit 42 with the operating pressure fluid supply. This will be understood from the foregoing and from consideration of Figs. 13, 12, 11 and 10 in the order named.

The arrangement of Figs. 10-14 has substantially all of the advantages of the embodiment of Figs. 7-9 for use with reversible vane type motors in which over-run takes place and also has the further advantage of the time delay provided by engagement of the head 187 with the land 191 as the valve piston 180 moves toward the left, or the engagement of the head 186 with the land 190 as the valve piston 180 moves toward the right, as the case may be, thus permitting a correspondingly increased period of over-run of the rotary assembly for any given rate of the relatively slow movement of the valve piston 180. It will be understood, however, that the lands 190 and 191 may be omitted from the arrangement of Figs. 10 to 14, in which case the arrangement thus modified would function in substantially the same manner as the arrangement of Figs. 7 to 9. The adjustability of the limited fluid connections for the ends of the valve piston, as provided by the adjustable orifices 196 and 197, are an added advantage of the arrangement of Figs. 10–14 and make it possible to cause the relatively slow movement of the valve piston to take place at almost any desired speed, as the particular operating conditions may require.

In both embodiments of the invention, movement of the valve piston responsive to difference in the pressure of the fluid acting on the opposite ends thereof establishes and dis-establishes full and open fluid connection between the operating pressure fluid supply and one end of the valve piston and also establishes and dis-establishes limited or restricted fluid connection between at least one end of the valve piston and other parts of the fluid circuit, thereby providing periods in which the movement of the valve piston is extremely rapid and other periods in which its movement is relatively slow. Also, in both embodiments the fluid connections for the inner ends of the vanes are changed during only the period or periods of the valve piston's extremely rapid movement and no change in the fluid connections for the inner ends of the vanes takes place during the periods of its relatively slow movement. In another aspect, both embodiments provide a period of extremely rapid movement of the valve piston followed by an interval or a period of relatively slow movement thereof in which fluid connection is provided between the supply of pressure fluid for the inner ends of the vanes and the inner ends of those vanes whose outer ends are passing through both the inlet and the outlet areas, this interval or period of relatively slow movement of the valve piston being in turn followed by a period of extremely rapid movement thereof. In both embodiments the interval between reversals is preferably at least equal to the time required for the valve piston to complete its movement from one to the other of the extreme ends of the valve bore.

It is to be understood that the foregoing are merely exemplifying disclosures and that changes, some of which have been indicated, may be made in the apparatus without departing from the invention which is defined in the appended claims.

I claim:

1. In a reversible vane type fluid pressure device, a rotor provided with a plurality of vanes movable inwardly and outwardly thereof, a casing including a track for guiding the vanes in their in-and-out movement and provided with interchangeable high pressure and low pressure areas, means for supplying two fluid pressures one a working pressure and the other a higher pressure, means for connecting either of said areas with said working fluid pressure and the other of said areas with the exhaust, interchangeable high and low pressure ports for the inner ends of said vanes, and valve means controlling the fluid connections for said ports, said valve means having an element movable responsive to reversal of relative pressures in said areas, the movement of said element establishing and dis-establishing fluid connections for said ports, the cycle of movement of said element comprising a range of relatively rapid movement in which one of said ports is disconnected from one of said areas and connected with said higher pressure fluid, a range of relatively slow movement in which both of said ports are connected with said higher pressure fluid and another range of relatively rapid movement in which the other of said ports is disconnected from said higher pressure fluid and connected with the other of said areas.

2. In a reversible rotary vane type fluid pressure device, a rotor provided with a plurality of vanes movable inwardly and outwardly thereof, a casing including a track for guiding the vanes in their in-and-out movement and provided with interchangeable high pressure and low pressure fluid areas for the outer ends of said vanes, the outer ends of said vanes being subject to the respective pressures in said areas while passing therethrough, interchangeable admission and discharge ports for the inner ends of said vanes and means controlling the fluid connections for said ports including means movably responsive to interchange of relative pressures in said areas and active by the movement thereof to establish and dis-establish fluid connections for said ports, the cycle of responsive movement of said last named means comprising at least one range of relatively slow movement and at least two ranges of relatively rapid movement with all changes in the fluid connections for said ports effected in said ranges of relatively rapid movement.

3. In a reversible rotary vane type fluid pressure device, a rotor provided with a plurality of vanes movable inwardly and outwardly thereof, a casing including a track for guiding the vanes in their in-and-out movement and provided with interchangeable high pressure and low pressure fluid areas for the outer ends of said vanes, the outer ends of said vanes being subject to the respective pressures in said areas while passing therethrough, interchangeable fluid admission and discharge means for the inner ends of the vanes and means controlling the fluid connections for said admission and discharge means including means actuated by admission of propulsive fluid upon interchange of relative pressures in said areas and active by the movement thereof to establish and dis-establish fluid connections for said admission and discharge means and to also establish and dis-establish fluid admission connections for the propulsive fluid producing movement thereof to thereby control the cycle of its responsive movement.

4. In a reversible rotary vane type fluid pressure device, a rotor provided with a plurality of vanes movable inwardly and outwardly thereof, a casing including a track for guiding the vanes in their in-and-out movement and provided with interchangeable high pressure and low pressure fluid areas, means for reversing the relative pressures in said areas to make either of said areas the high pressure area and the other the low pressure area, thereby reversing the direction of rotation of the rotor but said rotor tending to over-run momentarily before commencing to rotate in the reversed direction, means for supplying fluid having a pressure greater than the pressure of the fluid in whichever of said areas is the high pressure area, interchangeable high and low pressure ports for the inner ends of said vanes, and means responsive to reversal of relative pressures in said areas and active upon said reversal to substantially instantly disconnect one of said ports from the area which has just become the high pressure area and connect said port with said greater pressure fluid, to then provide an interval in which both of said ports are maintained in fluid connection with said greater pressure fluid, the duration of said interval being at least as great as the period of overrun of the rotor, and upon termination of said interval to substantially instantly disconnect the other of said ports from said greater pressure fluid and connect it with the area which is then the low pressure area.

5. In a reversible rotary vane type fluid pressure device, a rotor provided with a plurality of vanes movable inwardly and outwardly thereof, a casing including a track for guiding the vanes in their in-and-out movement and provided with interchangeable high pressure and low pressure areas, the outer ends of the vanes being subject to the respective pressures in said areas while passing therethrough, means for supplying pressure fluid for the inner ends of the vanes, said pressure fluid having pressure sufficient to move said vanes into contact with said track, interchangeable ports for the inner ends of the vanes, and valve means having an element movable to establish and dis-establish fluid connections for said ports and also including means responsive to interchange of relative pressures in said areas for producing an interval of relatively rapid movement of said element in which interval one of said ports is disconnected from one of said areas and is connected with the supply of pressure fluid for the inner ends of the vanes, an intermediate interval of longer duration than said first named interval and in which both of said ports are connected with the supply of pressure fluid for the inner ends of the vanes, and another interval of relatively rapid movement of said element in which the other of said ports is disconnected from the supply of pressure fluid for the inner ends of the vanes and is connected with the other of said areas.

6. In a reversible rotary vane type fluid pressure device, a rotor provided with a plurality of vanes movable inwardly and outwardly thereof, a casing including a track for guiding the vanes in their in-and-out movement and provided with interchangeable high pressure and low pressure areas, the outer ends of the vanes being subject to the respective pressures in said areas while passing therethrough, means for supplying pressure fluid for the inner ends of the vanes, said pressure fluid having pressure sufficient to move said vanes into contact with said track, interchangeable ports for the inner ends of the vanes, and means controlling the fluid connections for said ports, said last named means having an element active by the movement and position thereof to establish and dis-establish fluid connections for said ports and also active by the movement and position thereof to establish and dis-establish fluid connections regulating the flow of the propulsive fluid producing movement of said element.

7. In a reversible rotary vane type fluid pressure device, a rotor provided with a plurality of vanes movable inwardly and outwardly thereof, a casing including a track for guiding the vanes in their in-and-out movement and provided with interchangeable high pressure and low pressure areas, the outer ends of the vanes being subject to the respective pressures in said areas while passing therethrough, means for supplying pressure fluid for the inner ends of the vanes, said pressure fluid having pressure sufficient to move said vanes into contact with said track, interchangeable ports for the inner ends of the vanes, and means controlling the fluid connections for said ports, said last named means having an element active by the movement and position thereof to establish and dis-establish fluid connections for said ports and also active by the movement and position thereof to establish and dis-establish fluid connections regulating the flow of the propulsive fluid producing movement of said element and the flow of fluid determining the resistance to movement of said element.

8. In a reversible rotary vane type fluid pressure device, a rotor provided with a plurality of vanes movable inwardly and outwardly thereof, a casing including a track for guiding the vanes in their in-and-out movement and provided with interchangeable high pressure and low pressure areas, the outer ends of the vanes being subject to the respective pressures in said areas while passing therethrough, means for supplying pressure fluid for the inner ends of the vanes, said pressure fluid having pressure sufficient to move said vanes into contact with said track, interchangeable ports for the inner ends of the vanes, and means controlling the fluid connections for said ports, said last named means having an element active by the movement and position thereof to establish and dis-establish fluid connections for said ports and also active by the movement and position thereof to establish and dis-establish fluid connections regulating the flow of the propulsive fluid producing movement of said element, said last-named fluid connections including at least one connection for admitting the propulsive fluid relatively rapidly and at least one connection for admitting the propulsive fluid relatively slowly whereby movement of said element takes place at not less than two different speeds.

9. In a reversible rotary vane type fluid pressure device, a rotor provided with a plurality of vanes movable inwardly and outwardly thereof, a casing including a track for guiding the vanes in their in-and-out movement and provided with interchangeable high pressure and low pressure areas, the outer ends of the vanes being subject to the respective pressures in said areas while passing therethrough, means for supplying pressure fluid for the inner ends of the vanes, said pressure fluid having pressure sufficient to move said vanes into contact with said track, interchangeable ports for the inner ends of the vanes, and means controlling the fluid connections for said ports, said last named means having an element active by the movement and position thereof to establish and dis-establish fluid connections for said ports and also active by the movement and position thereof to establish and dis-establish fluid connections regulating the admission of the propulsive fluid producing movement of said element, said last named connections comprising in sequence at least a connection of relatively small restriction, a connection of relatively great restriction and another connection of relatively small restriction, whereby the cycle of movement of said element comprises at least three stages.

10. In a reversible rotary vane type fluid pressure device, a rotor provided with a plurality of vanes movable inwardly and outwardly thereof, a casing including a track for guiding the vanes in their in-and-out movement and provided with interchangeable high pressure and low pressure areas, the outer ends of the vanes being subject to the respective pressures in said areas while passing therethrough, means for supplying pressure fluid for the inner ends of the vanes, said pressure fluid having pressure sufficient to move said vanes into contact with said track, interchangeable ports for the inner ends of the vanes, and valve means controlling the fluid connections for said ports, said valve means having an element movable responsive to interchange of relative pressures in said areas and active by the movement and position thereof to establish and dis-establish fluid connections for said ports, the cycle of said responsive movement including in sequence a range of relatively slow movement in which the fluid connections for said ports existing prior to said interchange are maintained unchanged, a range of relatively rapid movement in which one of said ports is disconnected from one of said areas and is connected with the supply of pressure fluid for the inner ends of the vanes, a range of relatively slow movement in which both of said ports are connected with the supply of pressure fluid for the inner ends of the vanes and a range of relatively rapid movement in which the other of said ports is disconnected from the supply of pressure fluid for the inner ends of the vanes and is connected with the other of said areas.

11. In a reversible rotary vane type fluid pressure device, a rotor provided with a plurality of vanes movable inwardly and outwardly thereof, a casing including a track for guiding the vanes in their in-and-out movement and provided with interchangeable high pressure and low pressure areas, the outer ends of the vanes being subject to the respective pressures in said areas while passing therethrough, means for supplying pressure fluid for the inner ends of the vanes, said pressure fluid having pressure sufficient to move said vanes into contact with said track, interchangeable ports for the inner ends of the vanes, and valve means controlling the fluid connections for said ports, said valve means having an element movable responsive to interchange of relative pressures in said areas and active by the movement thereof to establish and dis-establish fluid connections for said ports, the cycle of responsive movement including an initial range of relatively slow movement of said element in which the fluid connections for said ports existing prior to reversal of pressures in said areas are maintained unchanged and also including at least one range of relatively rapid movement of said elements, with all changes of fluid connections for said ports effected during relatively rapid movement of said element.

12. In a reversible rotary vane type fluid pressure device, a rotor provided with a plurality of vanes movable inwardly and outwardly thereof, a casing including a track for guiding the vanes in their in-and-out movement and provided with interchangeable high pressure and low pressure fluid areas, means for reversing the relative pressures in said areas to make either of said areas the high pressure area and the other the low pressure area, thereby reversing the direction of rotation of the rotor but said rotor tending to over-run momentarily before commencing to rotate in the reversed direction, means for supplying fluid having a pressure greater than the pressure of the fluid in whichever of said areas is the high pressure area, interchangeable high and low pressure ports for the inner ends of said vanes, said greater pressure fluid being supplied to whichever of said ports is at the time the high pressure port, and valve means controlling the fluid connections for said ports including means functioning upon reversal of relative pressures in said areas to first continue unchanged throughout at least a portion of the period of over-run, the fluid connections for said ports existing prior to reversal of relative pressures in said areas and subsequently functioning to reverse the fluid connections for said ports.

13. In a reversible rotary vane type fluid pressure device, a rotor having a plurality of vanes movable inwardly and outwardly thereof, a casing including a track for guiding the vanes in their in-and-out movement and provided with interchangeable high pressure and low pressure areas for the outer ends of said vanes, whereby the outer ends of said vanes are subjected to the respective pressures in said areas while passing therethrough, means for reversing the relative pressures in said areas to make either of said areas the high pressure area and the other the low pressure area, thereby reversing the direction of rotation of the rotor but said rotor tending to over-run momentarily before commencing to rotate in the reversed direction, means for supplying fluid having a pressure greater than the pressure of the fluid in whichever of said areas is the high pressure area, and means controlling the fluid connections for the inner ends of said vanes comprising an element movable responsive to reversal of relative pressures in said areas and active by the movement and position thereof to establish and dis-establish fluid connections for the inner ends of said vanes, said element during non-reversing operation of the device being held by the high pressure area fluid in its position in which the inner ends of the vanes are connected with said greater pressure fluid during the time that the outer ends thereof are passing through said high pressure area with the inner ends of said vanes connected with the exhaust during the time that the outer ends thereof are passing through the low pressure area, said element moving substantially instantly upon reversal of relative pressures in said areas to connect the inner ends of said vanes with said greater pressure fluid during the time that the outer ends thereof are passing through both the high pressure and low pressure areas, said element maintaining said last named connections throughout an interval at least equal to the period of over-run of the rotor, and said element moving substantially instantly upon termination of said interval to connect the inner ends of the vanes with the exhaust during the time that the outer ends thereof are passing through the area which is then the low pressure area, with the inner ends of the vanes maintained in connection wtih said greater pressure fluid during the time that the outer ends thereof are passing through the area which is then the high pressure area.

14. In a reversible rotary vane type fluid pressure device, a rotor having a plurality of vanes movable inwardly and outwardly thereof, a casing including a track for guiding the vanes in their in-and-out movement and provided with interchangeable high pressure and low pressure areas for the outer ends of said vanes, whereby the outer ends of said vanes are subjected to the respective pressure in said areas while passing therethrough, means for reversing the relative pressures in said areas to make either of said areas the high pressure area and the other the low pressure area, thereby reversing the direction of rotation of the rotor but said rotor tending to over-run momentarily before commencing to rotate in the reversed direction, means for supplying fluid having a pressure greater than the pressure of the fluid in whichever of said areas is the high pressure area, and means controlling the fluid connections for the inner ends of said vanes comprising connecting-and-disconnecting means operating responsive to reversal of relative pressures in said areas, said last named means during non-reversing operation of the device connecting the inner ends of the vanes with said greater pressure fluid during the time that the outer ends thereof are passing through the high pressure area and also connecting the inner ends of the vanes with the low pressure area during the time that the outer ends thereof are passing through said low pressure area, said last named means operating upon reversal to maintain for an interval the fluid connections for the inner ends of the vanes existing prior to said reversal, said last named means operating substantially instantly upon termination of said interval to connect the inner ends of the vanes with said greater pressure fluid during the time that the outer ends thereof are passing through both the high pressure and the low pressure areas and to maintain said last named connections throughout another interval, the combined lengths of said first and second named intervals being at least equal to the period of over-run of the rotor, said last named means operating substantially instantly upon termination of said second named interval to connect the inner ends of the vanes with the low pressure area during the time that the outer ends thereof are passing through the area which is then the low pressure area, with the inner ends of the vanes connected with said greater pressure fluid during the time that the outer ends thereof are passing through the area which is then the high pressure area.

15. In a reversible rotary vane type fluid pressure device, a rotor having a plurality of vanes movable inwardly and outwardly thereof in slots formed therein, a casing including a track for guiding the vanes in their in-and-out movement and provided with interchangeable high pressure and low pressure areas, the outer ends of the vanes being subject to the respective pressures in said areas while passing therethrough, means for supplying pressure fluid for the inner ends of the vanes, said pressure fluid having pressure sufficient to move said vanes into contact with said track, interchangeable high pressure and low pressure vane slot ports arranged to connect successively with the inner ends of said slots as the rotor revolves, and valve means controlling the fluid connections for said vane slot ports, said valve means comprising a valve bore provided with a valve port and with a counterbore axially separated from one another by a land, a restricted fluid connection between said valve port and said counterbore, a substantially unrestricted fluid connection between said valve port and one of said areas, and a valve piston axially movable in said bore responsive to difference in fluid pressure acting on the opposite ends thereof and active by the movement and position thereof to establish and dis-establish fluid connections for said vane slot ports, said valve piston having a head and a reduced portion arranged to cooperate with said valve port, said counterbore and said land, said valve piston occupying a position in which said reduced portion provides substantially unrestricted connection between said valve port and said counterbore and in which one of said vane slot ports is connected with the supply of pressure fluid for the inner ends of the vanes and the other of said vane slot ports is connected with said valve port during non-reversing operation of the device in which the area connected with said valve port is the low pressure area, said valve piston moving substantially instantly upon interchange of relative pressures in said areas until said head engages said land and cuts off unrestricted fluid connection between said valve port and said counterbore, whereby propulsive fluid for movement of said valve piston is admitted to said counterbore only through said restricted connection and said valve piston is moved relatively slowly during the time that said head engages said land, said valve piston moving through the remainder of its path of movement substantially instantly when said head moves out of engagements with said land, said valve piston during said first named substantially instant movement disconnecting said vane slot port from said valve port and connecting it with said supply of pressure fluid for the inner ends of the vanes, said valve piston during said relatively slow movement connecting both of said vane slot ports with said supply of pressure fluid for the inner ends of the vanes and said valve piston during said second named substantially instant movement disconnecting the other of said vane slot ports from said supply of pressure fluid for the inner ends of the vanes and connecting it with the area which is then the low pressure area.

16. In a reversible rotary vane type fluid pressure device, a rotor having a plurality of vanes movable inwardly and outwardly thereof in slots formed therein, a casing including a track for guiding the vanes in their in-and-out movement and provided with interchangeable high pressure and low pressure areas, the outer ends of the vanes being subject to the respective pressures in said areas while passing therethrough, means for supplying pressure fluid for the inner ends of the vanes, said pressure fluid having pressure sufficient to move said vanes into contact with said track, interchangeable high pressure and low pressure vane slot ports arranged to connect successively with the inner ends of said slots as the rotor revolves, and valve means controlling the fluid connections for said vane slot ports, said valve means comprising a valve bore provided near the opposite ends thereof with first and second groups respectively of cooperating ports, each group including a valve port having substantially unrestricted fluid connection with one of said areas and a counter-bore axially separated from said valve port by a land, a restricted fluid connection between the valve port and counter-bore of each group, a valve piston axially movable in said bore responsive to difference in fluid pressures acting on the opposite ends thereof and active by the movement and position thereof to establish and disestablish fluid connections for the inner ends of said vanes, said valve piston having near each end thereof a head and a reduced portion arranged to cooperate with the correspondingly disposed group of ports, said valve piston during non-reversing operation of the device occupying a position in which one of said heads is disposed in the valve port connected with the area which is then the high pressure area and the other of said heads is disposed in the counter-bore adjacent the other of said valve ports with the reduced portion adjacent said last named head providing substantially unrestricted fluid connection between said last named valve port and counter-bore, said valve piston in said last named position also connecting one of said vane slot ports with the supply of pressure fluid for the inner ends of the vanes and the other of said vane slot ports with the area which is then the low pressure area, said valve piston moving substantially instantly upon reversal of the relative pressures in said areas until said heads engage said lands respectively and cut off the substantially unrestricted fluid connections between the valve ports and counter-bores of both groups, whereby propulsive fluid for movement of said valve piston is admitted to one end of said valve piston only through one of said restricted connections and the fluid displaced by the other end of said valve piston is permitted to escape only through the other of said restricted connections so that said valve piston is moved relatively slowly during the time that said heads engage said lands, said valve piston moving through the remainder of its path of axial movement in said bore substantially instantly upon disengagement of said heads and said lands, said valve piston during said first named substantially instant movement disconnecting one of said vane slot ports from the area which was the low pressure area prior to reversal of relative pressures and connecting said vane slot port with the supply of pressure fluid for the inner ends of the vanes, said valve piston during said relatively slow movement connecting both of said vane slot ports with the supply of pressure fluid for the inner ends of said vanes and said valve piston during said second named substantially instant movement disconnecting the other of said vane slot ports from the supply of pressure fluid for the inner ends of the vanes and connecting it with the area which became the low pressure area upon reversal of relative pressures in said areas.

17. In a reversible rotary vane type fluid pressure device, a rotor having a plurality of vanes movable inwardly and outwardly thereof in slots formed therein, a casing including a track for guiding the vanes in their in-and-out movement and provided with interchangeable high pressure and low pressure areas, the outer ends of the vanes being subject to the respective pressures in said areas while passing therethrough, means for supplying pressure fluid for the inner ends of the vanes, said pressure fluid having pressure sufficient to move said vanes into contact with said track, interchangeable high pressure and low pressure vane slot ports arranged to connect successively with the inner ends of said slots as the rotor revolves, and valve means controlling the fluid connections for said vane slot ports, said valve means comprising a valve bore having a pair of lands disposed near the axially opposite ends thereof, each land terminating in a counter-bore at one of the axial sides of said land, a valve piston axially movable in said bore responsive to difference in fluid pressures acting on the opposite ends thereof and active by the movement and position thereof to establish and disestablish fluid connections for said vane slots ports, said valve piston having a pair of heads disposed one near each end thereof, a restricted fluid connection between one of the axial ends of said valve bore and one of said areas, another restricted connection between the other of the axial ends of said valve bore and the other of said areas, and means providing substantially unrestricted fluid connections between one of said counter-bores and one of said areas and between the other of said counter-bores and the other of said areas, said valve piston during non-reversing operation of said device occupying a position in which one of said heads engages the land near the axial end of the valve bore having the restricted fluid connection with the area which is then the low pressure area, said valve piston in said last named position also connecting one of said vane slot ports with the supply of pressure fluid for the inner ends of the vanes and connecting the other of said vane slot ports with the area which is then the low pressure area, said valve piston upon reversal of the relative pressures in said areas being relatively slowly moved by propulsive fluid admitted to the end of the valve bore only through said restricted connection during the time that said head engages said land, the fluid connections for the vane slot ports remaining unchanged throughout the time that said head moves in engagement with said land, and said valve piston moving substantially instantly to alter the fluid connections for said vane slot ports upon disengagement of said head and said land.

18. In a reversible rotary vane type fluid pressure device, a rotor having a plurality of vanes movable inwardly and outwardly thereof in slots formed therein, a casing including a track for guiding the vanes in their in-and-out movement and provided with interchangeable high pressure and low pressure areas, the outer ends of the vanes being subject to the respective pressures in said areas while passing therethrough, means for supplying pressure fluid for the inner ends of the vanes, said pressure fluid having pressure sufficient to move said vanes into contact with said track, interchangeable high pressure and low pressure vane slot ports arranged to connect successively with the inner ends of said slots as the rotor revolves, and valve means controlling the fluid connections for said vane slot ports, said valve means comprising a valve bore having a valve port continuously connected with the supply of pressure fluid for the inner ends of the vanes and an element movable in said bore responsive to difference in pressures in said areas, said element having an intermediate range of movement in said valve bore in which the speed thereof is different from the speed of its movement prior to and subsequent to its movement through said intermediate range, said element during its movement in said intermediate range connecting both of said vane slot ports with valve port, said element at all other times maintaining connection between said valve port and only one of said vane slot ports.

19. In a reversible vane type fluid pressure device, a rotor provided with a plurality of vanes movable inwardly and outwardly thereof, a casing including a track for guiding the vanes in their in-and-out movement and provided with interchangeable high pressure and low pressure areas, the outer ends of the vanes being subject to the pressures in said areas while passing therethrough, means for supplying pressure fluid for the inner ends of the vanes, said pressure fluid having pressure sufficient to move said vanes in contact with said track, a pair of ports for the inner ends of the vanes, fluid connections for said ports and means responsive to the interchange of pressure in said areas for controlling said fluid connections, said last named means including a movable valve element which during reversal of the device occupies momentarily a position in which the connections to both of the said ports are open to said fluid pressure and then disconnects one of said ports by a rapid movement.

20. In a reversible rotary vane type fluid pressure device, a rotor provided with a plurality of vanes movable inwardly and outwardly thereof, a casing including a track for guiding the vanes in their in-and-out movement and provided with interchangeable high pressure and low pressure fluid areas, means for reversing the relative pressures in said areas to make either of said areas the high pressure area and the other the low pressure area, interchangeable high pressure and low pressure ports for the inner ends of said vanes and means for reversing the fluid connections for said ports responsive to change of relative pressures in said areas including means functioning to maintain unchanged throughout a time delay interval and prior to effecting reversal thereof, the connections for said ports existing prior to reversal of relative pressures in said areas and functioning to effect reversal of the fluid connections for said ports after termination of said time delay interval.

CHARLES M. KENDRICK.